US012558762B2

(12) United States Patent
Abbott et al.

(10) Patent No.: US 12,558,762 B2

(45) Date of Patent: Feb. 24, 2026

(54) TORQUE STICK FOR A ROTARY IMPACT TOOL

(71) Applicant: MILWAUKEE ELECTRIC TOOL CORPORATION, Brookfield, WI (US)

(72) Inventors: Jonathan E. Abbott, Wilmington, DE (US); Jacob P. Schneider, Cedarburg, WI (US); Peter Malak, Waukesha, WI (US); Christopher S. Hoppe, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 19/044,285

(22) Filed: Feb. 3, 2025

(65) Prior Publication Data

US 2025/0178168 A1 Jun. 5, 2025

Related U.S. Application Data

(63) Continuation of application No. 18/632,535, filed on Apr. 11, 2024, now Pat. No. 12,251,801, which is a (Continued)

(51) Int. Cl.

*B25B 23/00* (2006.01)
*B25B 21/02* (2006.01)
*B25B 23/147* (2006.01)

(52) U.S. Cl.

CPC ........ *B25B 23/1475* (2013.01); *B25B 21/026* (2013.01); *B25B 23/0021* (2013.01)

(58) Field of Classification Search

CPC .............. B25B 21/026; B25B 23/0021; B25B 23/1475

See application file for complete search history.

(56) References Cited

U.S. PATENT DOCUMENTS 4,106,570 A 8/1978 Eshghy et al.
4,572,041 A 2/1986 Rissmann (Continued)

FOREIGN PATENT DOCUMENTS

JP 2014030870 A 2/2014
KR 101804438 B1 12/2017

OTHER PUBLICATIONS

McMaster-Carr, "Adjustable Torque-Limiting Socket Adapters," <https://www.mcmaster.com/torque-limiters/adjustable-torque-limiting-socket-adapters/> web page visited Oct. 19, 2021.

(Continued)

*Primary Examiner* — Eyamindae C Jallow

(74) *Attorney, Agent, or Firm* — Michael Best & Friedrich LLP

(57) ABSTRACT

A tool attachment includes a first end configured to engage a rotary impact tool, a second end disposed distally from the first end and configured to engage a workpiece, a first concentric body that is coupled to and rotated by the first end, and a second concentric body that is coupled to the second end and rotated by the first concentric body. The second concentric body and the first concentric body are coupled together. The first concentric body rotates relative to the second concentric body to limit the amount of torque delivered from the rotary impact tool to the workpiece.

21 Claims, 19 Drawing Sheets

Related U.S. Application Data continuation of application No. 17/497,753, filed on Oct. 8, 2021, now Pat. No. 11,986,932.

(60) Provisional application No. 63/089,856, filed on Oct. 9, 2020.

(56) References Cited

U.S. PATENT DOCUMENTS

| | | | | | |
|---|---|---|---|---|---|
| 4,984,489 | A * | 1/1991 | Krauthamer | B25B 13/50 | 81/124.2 |
| 5,048,378 | A * | 9/1991 | Nikolas | B25B 13/50 | 81/176.15 |
| 5,615,587 | A * | 4/1997 | Foerster, Jr. | B25B 23/101 | 81/125 |
| 6,010,154 | A * | 1/2000 | Payne | B60S 9/08 | 81/176.15 |
| 6,477,924 | B1 * | 11/2002 | Talbot | B25B 13/48 | 81/176.15 |
| 6,901,825 | B1 * | 6/2005 | Lebron | E06B 9/78 | 81/176.15 |
| 7,210,207 | B1 * | 5/2007 | Frady | B25B 13/48 | 29/256 |
| 7,611,127 | B1 * | 11/2009 | Moore | B25B 23/0021 | 254/122 |
| 8,800,407 | B2 | 8/2014 | DeBaker | | |
| 9,382,960 | B2 | 7/2016 | Kluger et al. | | |
| 9,434,056 | B2 | 9/2016 | Seith et al. | | |
| 2006/0016300 | A1 | 1/2006 | Bubel | | |
| 2021/0146515 | A1 | 5/2021 | Doyle | | |
| 2021/0339361 | A1 | 11/2021 | Abbott et al. | | |

OTHER PUBLICATIONS

Hilti, "S-TB Torque Bar," <https://www.hilti.com/c/CLS_POWER_TOOL_INSERT_7126/CLS_SCREW_DRIVER_BITS_SOCKETS_7126/CLS_TORQUE_BARS_7126/r1830455.html> web page visited Oct. 19, 2021.

International Search Report and Written Opinion for Application No. PCT/US2021/054288 dated Feb. 22, 2022 (15 pages).

* cited by examiner

TORQUE STICK FOR A ROTARY IMPACT TOOL

CROSS-REFERENCE TO RELATED APPLICATIONS

This application is a continuation of U.S. patent application Ser. No. 18/632,535, filed on Apr. 11, 2024, now U.S. Pat. No. 12,251,801, which is a continuation of U.S. patent application Ser. No. 17/497,753, filed on Oct. 8, 2021, now U.S. Pat. No. 11,986,932, which claims priority to U.S. Provisional Patent Application No. 63/089,856, filed on Oct. 9, 2020, the entire contents of all of which are incorporated herein by reference.

FIELD OF THE DISCLOSURE

The present invention relates to power tools, and more particularly to rotary impact tools.

BACKGROUND OF THE DISCLOSURE

Rotary impact tools (e.g., an impact driver or wrench) are typically utilized to provide a striking rotational force, or intermittent applications of torque, to a tool adapter or workpiece (e.g., a fastener) to either tighten or loosen the fastener. As such, impact wrenches are typically used to loosen or remove stuck fasteners (e.g., an automobile lug nut on an axle stud) that are otherwise not removable or very difficult to remove using hand tools. Various tool attachments, such as torque sticks, can be used to limit the amount of torque delivered from the impact wrench to the workpiece.

SUMMARY OF THE INVENTION

The present invention provides, in one aspect, a tool attachment for use with a rotary impact tool to drive a workpiece. The tool attachment includes a first end configured to engage the rotary impact tool, a second end disposed distally from the first end and configured to engage the workpiece, a first concentric body that is coupled to and rotated by the first end, and a second concentric body that is coupled to the second end and rotated by the first concentric body. The second concentric body and the first concentric body are coupled together. The first concentric body rotates relative to the second concentric body to limit the amount of torque delivered from the rotary impact tool to the workpiece.

The present invention provides, in another aspect, a tool attachment for use with a rotary impact tool to drive a workpiece. The tool attachment includes a first end configured to engage the rotary impact tool, a second end disposed distally from the first end and configured to engage the workpiece, and a spring interconnecting the first end and the second end, where the spring has a spring stiffness. The spring enables the first end to rotate relative to the second end in response to a reaction torque being exerted on the spring from the workpiece in accordance with the spring stiffness.

The present invention provides, in another aspect, a tool attachment for use with a rotary impact tool to drive a workpiece. The tool attachment includes a first end configured to engage the rotary power tool, a second end disposed distally from the first end and configured to engage the workpiece, and a first body and a second body coupled together and interconnecting the first end and the second end. The first body moveable between a retracted position, in which a contact interface between the first body and the second body is increased, and an extended position, in which the contact interface between the first body and the second body is decreased. The contact interface includes a curvilinear profile that enables the contact interface to increase, regardless of whether the first body is in the retracted position or the extended position, in response to the first body deflecting from a reaction torque applied to the second body by the workpiece during a workpiece driving operation.

The present invention provides, in another aspect, a tool attachment for use with a rotary impact tool to drive a workpiece. The tool attachment includes a first end configured to engage the rotary impact tool, a second end disposed distally from the first end and configured to engage the workpiece, an elongated shaft extending between and interconnecting the first end and the second end. The elongated shaft rotates about a rotational axis. The tool attachment further includes a sleeve disposed around and co-rotatable with the elongated shaft. The sleeve including at least one tab extending in a direction parallel with the rotational axis. The tool attachment further includes a stop nut disposed around the elongated shaft that mechanically interfaces with the sleeve. The stop nut includes a reverse stop wall that interfaces with the tab of the sleeve, allowing the elongated shaft, the sleeve, and the stop nut to co-rotate in a counterclockwise direction. The stop nut further includes a forward stop wall that is spaced from the tab of the sleeve, allowing the elongated shaft and the sleeve to rotate relative to the stop nut in a clockwise direction.

The present invention provides, in another aspect, a rotary impact tool including a housing and a motor within the housing. The motor includes a motor shaft that produces a rotational output to drive a gear assembly. The rotary impact tool further includes a drive assembly driven by the gear assembly. The drive assembly includes a hammer coupled to the motor shaft and an anvil configured to receive an impact from the hammer. The rotary impact tool further includes a torque stick integrated with and formed as one piece with the anvil to limit the amount of deliverable torque to a workpiece in accordance with a torsional stiffness of the torque stick. The rotary impact tool further includes a first position sensor to detect angular displacement of a first end of the anvil, a second position sensor to detect angular displacement of a second end of the anvil, and a controller in electrical communication with the first position sensor and the second position sensor. The controller is configured to receive a first signal from the first position sensor based on rotation of the first end of the anvil, receive a second signal from the second position sensor based on rotation of the second end of the anvil, calculate the difference of the first signal and the second signal to obtain a rebound angle, calculate torque delivered to the workpiece from the impact by multiplying the torsional stiffness of the torque stick and the rebound angle, and control the motor based on the torque delivered to the workpiece.

The present invention provides, in another aspect, a tool adapter configured to couple to a rotary tool to drive a workpiece. The tool adapter includes a first end configured to engage the rotary tool, a second end disposed opposite the first end and configured to engage the workpiece, and a body extending between and interconnecting the first end and the second end, where the body rotates about a rotational axis. The tool adapter further includes a means disposed on at least one of the first end or the second end for rotationally locking the tool adapter relative to at least one of the rotary tool or the workpiece, thereby inhibiting relative rotational movement between the tool adapter and at least one of the rotary tool or the workpiece.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
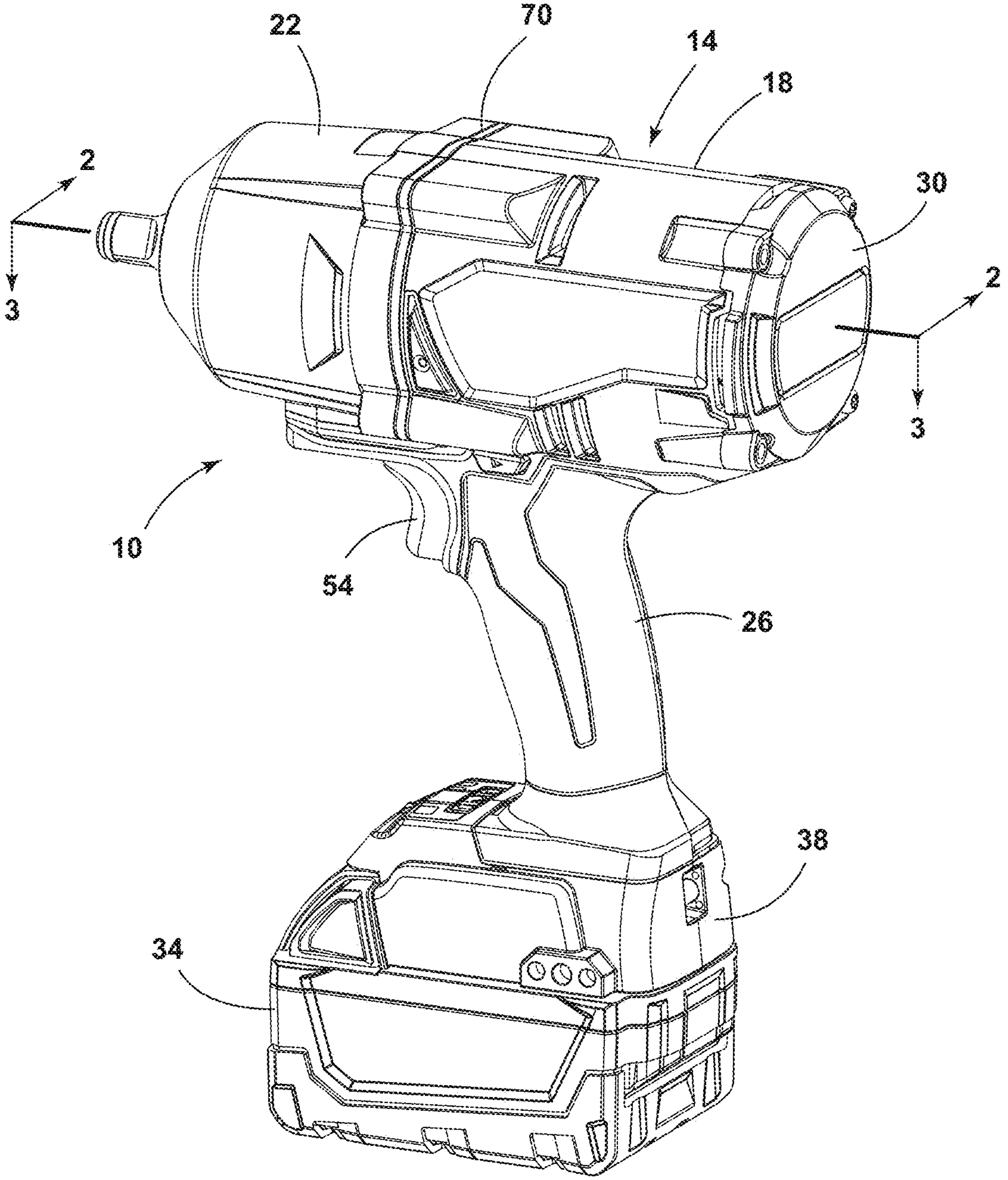
FIG. 1 is a perspective view of an exemplary rotary impact tool that may receive a torque stick according to an embodiment of the invention.

FIG. 1 illustrates a rotary impact tool 10 in the form of an impact wrench. In other embodiments, the impact wrench 10 may alternatively be in the form of a hydraulic pulse tool, a direct drive tool, or other similar tool. The impact wrench 10 includes a housing 14 with a motor housing portion 18, a front housing portion 22 coupled to the motor housing portion 18 (e.g., by a plurality of fasteners), and a handle portion 26 extending downward from the motor housing portion 18. In the illustrated embodiment, the handle portion 26 and the motor housing portion 18 are defined by cooperating clamshell halves. The illustrated housing 14 also includes an end cap 30 coupled to the motor housing portion 18 opposite the front housing portion 22.

Figure 2:
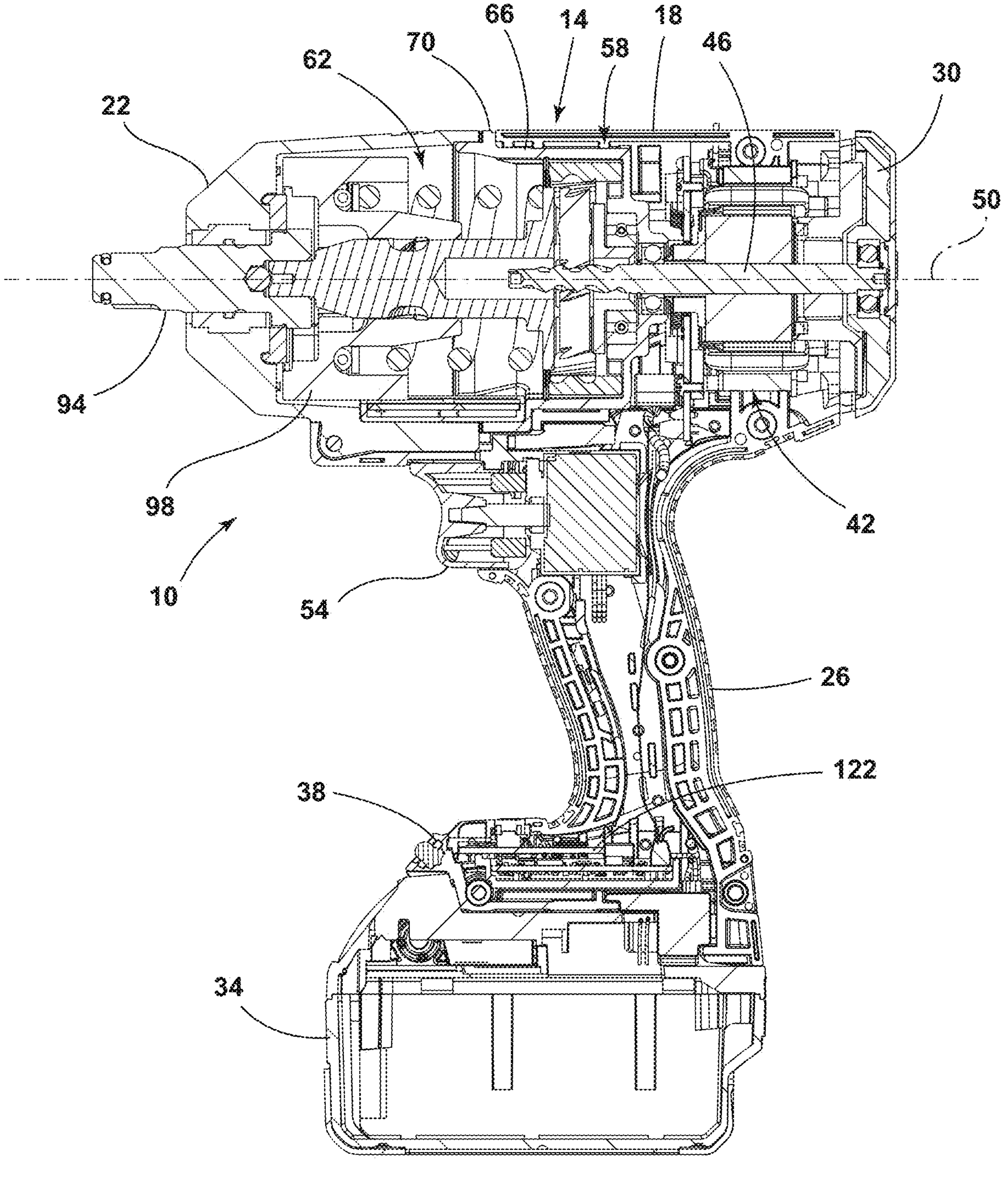
FIG. 2 is a cross-sectional view of the rotary impact tool of FIG. 1, taken along line 2-2 in FIG. 1.

Referring to FIGS. 1 and 2, the impact wrench 10 has a battery 34 removably coupled to a battery receptacle 38 located at a bottom end of the handle portion 26. An electric motor 42, supported within the motor housing portion 18, receives power from the battery 34 when the battery 34 is coupled to the battery receptacle 38. In the illustrated embodiment, the motor 42 is a brushless direct current ("BLDC") motor with an output shaft 46 that is driven about an axis 50. In other embodiments, other types of motors may be used.

The impact wrench 10 also includes a switch (e.g., switch 54) supported by the housing 14 that selectively electrically connects the battery 34 and the motor 42 to provide DC power to the motor 42. In other embodiments, the impact wrench 10 may include a power cord for electrically connecting the switch 54 and the motor 42 to a source of AC power. As a further alternative, the impact wrench 10 may be configured to operate using a different power source (e.g., a pneumatic or hydraulic power source, etc.).

The impact wrench 10 further includes a gear assembly 58 coupled to the motor output shaft 46 and a drive assembly 62 coupled to an output of the gear assembly 58. The gear assembly 58 may be configured in any of a number of different ways to provide a speed reduction between the output shaft 46 and an input of the drive assembly 62. The gear assembly 58 is at least partially housed within a gear case 66 fixed to the housing 14. In the illustrated embodiment, the gear case 66 includes an outer flange 70 that is sandwiched between the front housing portion 22 and the motor housing portion 18. The fasteners that secure the front housing portion 22 to the motor housing portion 18 also pass through the outer flange 70 of the gear case 66 to fix the gear case 66 relative to the housing 14.

Figure 3:
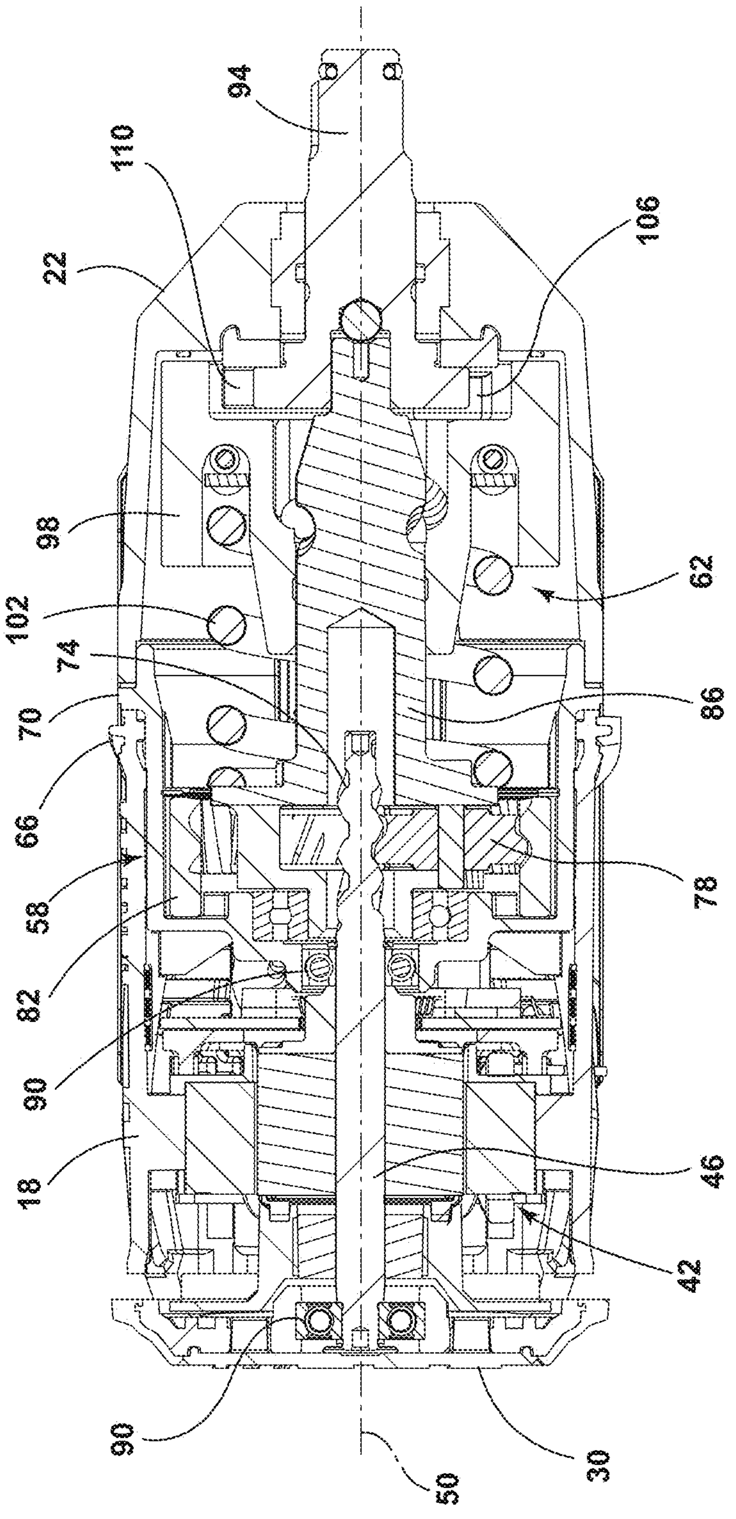
FIG. 3 is a cross-sectional view of the rotary impact tool of FIG. 1, taken along line 3-3 in FIG. 1.

Best illustrated in FIG. 3, the gear assembly 58 includes a helical pinion 74 formed on the output shaft 46, a plurality of helical planet gears 78 meshed with the helical pinion 74, and a helical ring gear 82 meshed with the planet gears 78 and rotationally fixed within the gear case 66. The planet gears 78 are mounted on a camshaft 86 of the drive assembly 62 such that the camshaft 86 acts as a planet carrier. Accordingly, rotation of the output shaft 46 rotates the planet gears 78, which then advance along the inner circumference of the ring gear 82 and thereby rotate the camshaft 86. The output shaft 46 is rotatably supported by a plurality of bearings 90. Although the pinion 74, the planet gears 78, and the ring gear 82 have a helical interface therebetween, in other embodiments, a different interface between these components may be used, such as a straight bevel, a spiral bevel, or the like.

With continued reference to FIG. 3, the drive assembly 62 of the impact wrench 10 includes an anvil 94, extending from the front housing portion 22, to which a tool attachment, such as a torque stick 100 (FIG. 6) can be coupled for performing work on a workpiece (e.g., a fastener). The drive assembly 62 is configured to convert the constant rotational force or torque provided by the gear assembly 58 to a striking rotational force or intermittent delivery of torque to the anvil 94 when the reaction torque exerted on the anvil 94 exceeds a certain threshold (e.g., due to engagement with a workpiece). In the illustrated embodiment of the impact wrench 10, the drive assembly 62 includes the camshaft 86, a hammer 98 supported on and axially slidable relative to the camshaft 86, and the anvil 94.

With reference to FIG. 3, the drive assembly 62 further includes a spring 102 biasing the hammer 98 toward the front of the impact wrench 10 (i.e., in the right direction of FIG. 3). In other words, the spring 102 biases the hammer 98 along the axis 50 into engagement with the anvil 94. The spring 102 allows the drive assembly 62 to move between an engaged state, in which hammer lugs 106 of the hammer 98 are meshed with anvil lugs 110 of the anvil 94, and a disengaged state, in which the hammer lugs 106 are spaced away from the anvil lugs 110 in a direction parallel to the axis 50. In the disengaged state, the hammer lugs 106 cam against the anvil lugs 110, causing the hammer 98 to retract away from the anvil 94 against the bias of the spring 102. This occurs when the reaction torque exerted on the anvil 94 (via driving a workpiece) exceeds the biasing force of the spring 102. The camshaft 86 further includes cam grooves 114 in which corresponding cam balls 118 are received. The cam balls 118 are in driving engagement with the hammer 98. The cam balls 118 are capable of moving within the cam grooves 114, which allows for relative axial movement of the hammer 98 along the camshaft 86 between the engaged state and the disengaged state while the camshaft 86 continues to rotate.

Figure 4:
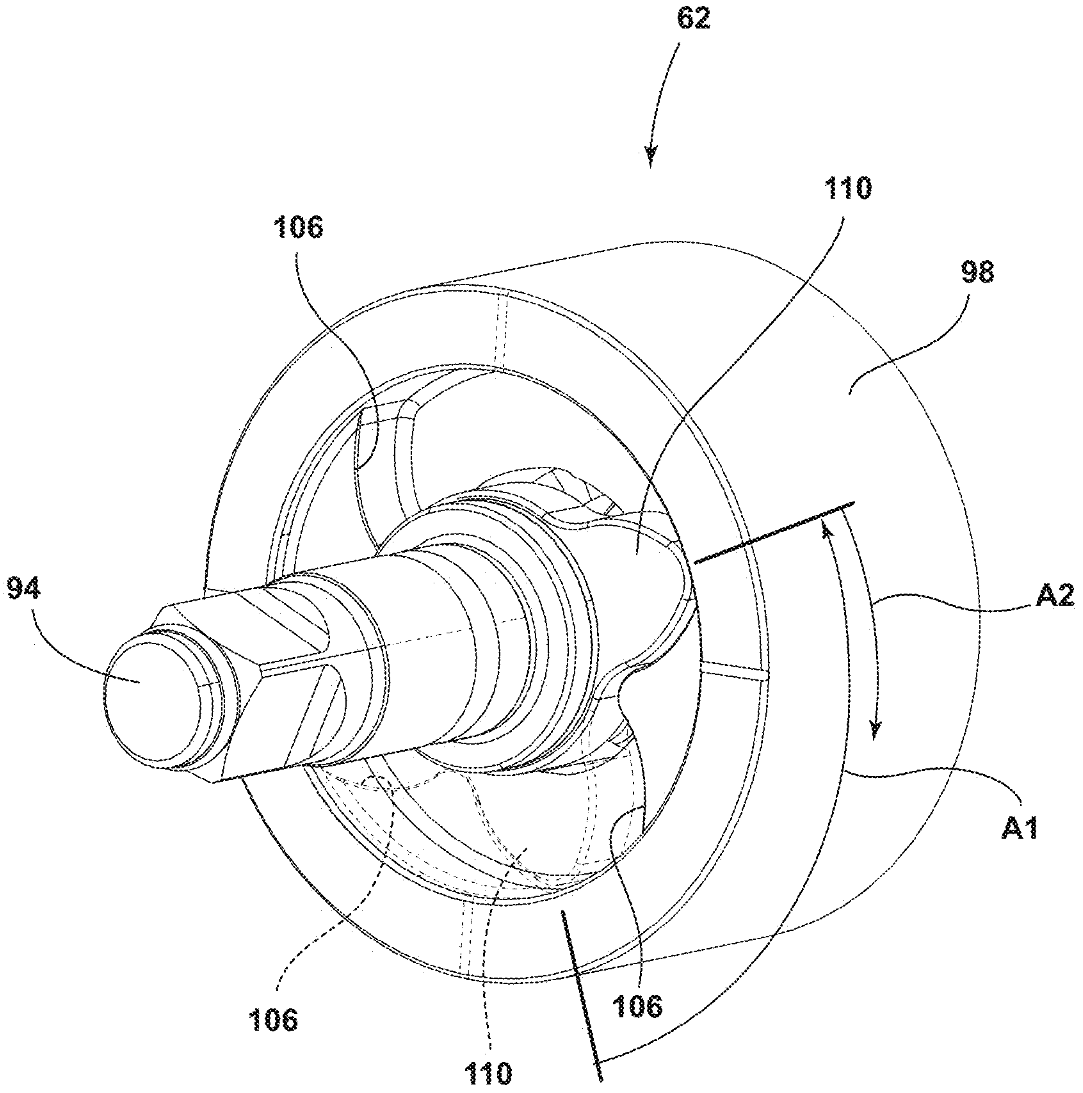
FIG. 4 is a perspective view of a portion of a drive assembly of the rotary impact tool, illustrating a hammer and an anvil.
Figure 7:
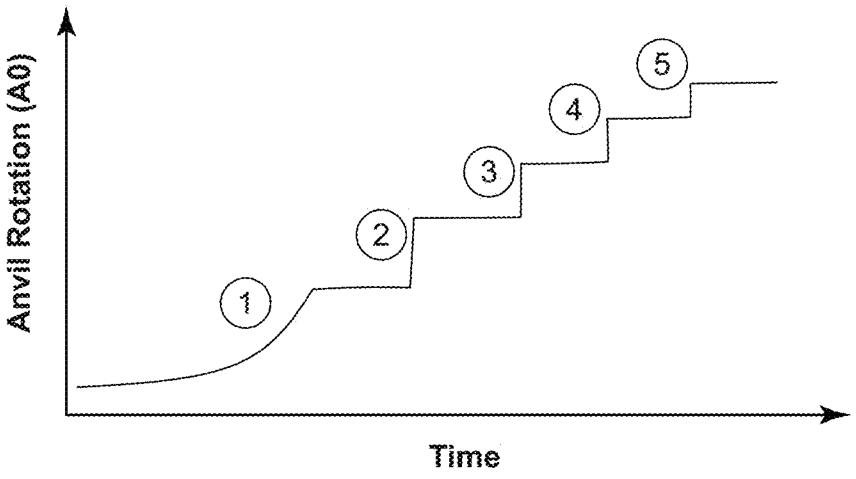
FIG. 7 is a graphical representation of an output signal from an anvil position sensor, illustrating the angular displacement of the anvil while the rotary impact tool is in operation.

With reference to FIG. 4, there are two hammer lugs 106 that are spaced 180 degrees apart from each other. In other embodiments, there may be fewer or more than two hammer lugs 106 in various spaced configurations. As such, the motor 42 rotates a predetermined number of degrees when the drive assembly 62 is in the disengaged state (i.e., 180 degrees for the drive assembly 62) due to the hammer lugs 106 being spaced apart from each other. Particularly, when the impact wrench 10 is impacting, the hammer 98 rotates 180 degrees without the anvil 94, impacts the anvil 94, and then rotates with the anvil 94 a certain amount (i.e., a drive angle A1) before repeating this process. The drive angle A1 indicates the number of degrees that the anvil 94 rotated with the hammer 98, which is equivalent to the number of degrees that the workpiece rotated. As an example, when the impact wrench 10 is driving a fastener into a joint, the hammer 98 may rotate a total of 225 degrees from one impact to the next impact. In this example of 225 degrees, 45 degrees of the rotation includes the hammer 98 and the anvil 94 in the engaged state and rotating together (i.e., the drive angle A1) and 180 degrees includes the hammer 98 rotating by itself in the disengaged state until the next impact. The drive angle A1 as defined here represents the angle through which the anvil 94 (or the workpiece, the hammer 98, or some other component) rotates from one impact, whereas the total drive angle A0 (FIGS. 7, 8, and 10) as defined here represent the angle through which the anvil 94 (or the workpiece, the hammer 98, or some other component) rotates during the fastening sequence. The fastening sequence, for example, may include a rundown phase of the workpiece until it seated and the impact phase of the workpiece until the workpiece is torqued to the desired torque limit, or may include just the impact phase once the workpiece is already seated.

Figure 5:
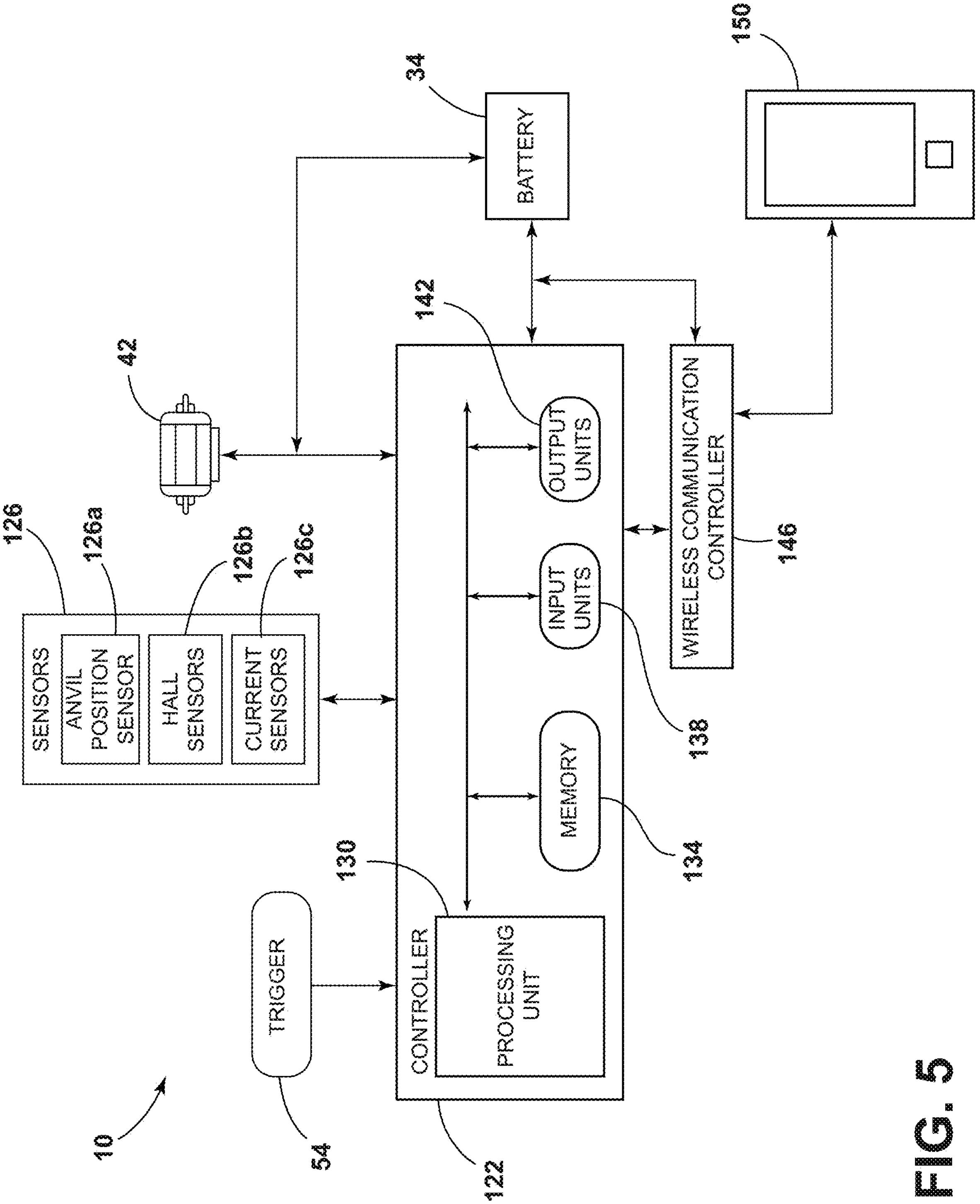
FIG. 5 illustrates a schematic diagram of the rotary impact tool.

With reference to FIG. 5, the impact wrench 10 further includes a controller 122 disposed in the handle portion 26 adjacent the battery receptacle 38 and sensors 126 in electrical communication with the controller 122. The controller 122 is also electrically and/or communicatively connected to a variety of other modules and components of the impact wrench 10. The controller 122 includes a plurality of electrical and electronic components that provide power, operational control, and protection to the components and modules within the controller 122 and/or the impact wrench 10. Specifically, the controller 122 includes, among other things, a processing unit 130 (e.g., a microprocessor, a microcontroller, electronic processor, electronic controller, or another suitable programmable device), a memory 134, input units 138, and output units 142. The controller 122, for example, interfaces with the battery 34 and receives trigger signals (via the input units 138) when the switch 54 is depressed to actively control power supplied to the motor 42 (via the output units 142). In some embodiments, the impact wrench 10 further includes a wireless communication controller 146 for wirelessly sending and receiving signals between the controller 122 and an external device 150. The external device 150 may be, for example, a smart phone (as illustrated), a laptop computer, a tablet computer, or another electronic device capable of communicating wirelessly with the impact wrench 10 and providing a user interface (or GUI). The external device 150 can transmit data to the impact wrench 10 for power tool configuration, firmware updates, to send/receive commands (e.g., tool modes, operational parameters, etc.), or other such information.

The sensors 126 communicate to the controller 122 various signals indicative of different parameters of the impact wrench 10. The sensors 126 at least include an anvil position sensor 126*a* that outputs angular position of the anvil 94. Based on the angular position from the anvil position sensor 126*a*, the controller 122 can determine the angular displacement (i.e., the drive angle A1, the total drive angle A0, etc.) of the anvil 94 and the amount of torque applied to a workpiece, as described in further detail below. In other embodiments, the position sensor 126*a* may alternatively output angular and translational position of the hammer 98, at which point, the controller 122 can determine the angular displacement of the hammer 98 and the amount of torque applied to a workpiece. In some embodiments, the sensors 126 may also include a Hall sensor 126*b* and current sensor 126*c* that output motor feedback information to the controller 122, such as an indication (e.g., pulse) when a magnet of the motor rotates across the Hall sensor 126*b*. Although the illustrated sensor 126*a* is a rotation sensor, in other embodiments, the sensor 126*a* may alternatively be a combination of inductive and/or capacitance sensors. Still, in other embodiments, the sensor 126*a* may be a camera mounted adjacent the anvil 94 that is capable of analyzing angular displacement of at least one of the anvil 94 and the torque stick 100. Still, in other embodiments, the sensors 126 may be a combination of sensors (e.g., sensors 126*a*, 126*b*, 126*c*) that cooperate together to determine angular displacement of the anvil 94.

Figure 6:
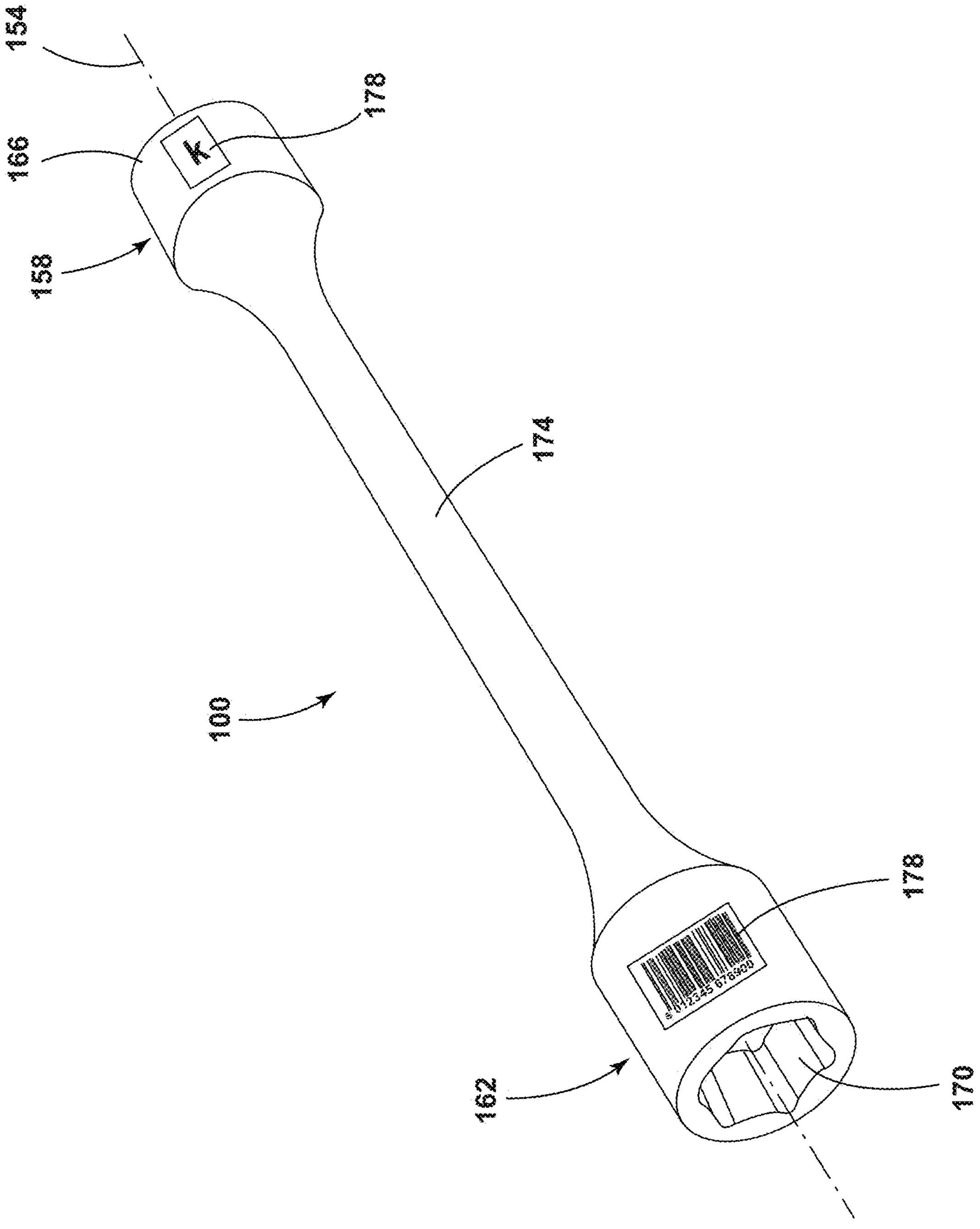
FIG. 6 is a perspective view of a torque stick that is attachable to the anvil of the rotary impact tool.

With reference to FIG. 6, some tool attachments, such as the torque stick 100, can be coupled to the anvil 94 to limit the amount of torque delivered from the impact wrench 10 to a workpiece within a predetermined torque range. To provide some background, the torque stick 100 functions as a torsion spring when driving a workpiece, such that the torque stick 100 transfers rotational force to a workpiece until the torque stick 100 deflects (or twists) along a rotational axis 154 as the predetermined torque range is reached in accordance with a spring stiffness k. After torque is no longer applied to the torque stick 100, the torque stick 100 rebounds (or counter-rotates) the deflected amount. So, when the torque stick 100 is coupled to the anvil 94, the torque stick 100 rotates with the anvil 94 while the torque stick 100 deflects (or twists) in response to the reaction torque being exerted on the torque stick 100 by the workpiece in accordance with the spring stiffness k. Essentially, the anvil 94 continues to drive a first end 158 of the torque stick 100 as the first end 158 deflects (or twists) relative to a second end 162 of the torque stick 100. At this point, the amount of torque delivered to the workpiece is thereby limited because any additional torque delivered by the impact wrench 10 is absorbed by the torque stick 100 when the first end 158 twists relative to the second end 162. When rebounding, the first end 158 of the torque stick 100 counter-rotates when torque is no longer applied through the torque stick 100. The rebounding of the torque stick 100 also counter-rotates the anvil 94, which is detected by the anvil position sensor 126*a* and outputted as a rebound angle A2 (FIG. 4). In some embodiments, the controller 122 may alternatively calculate the rebound angle A2 by detecting the amount of torque exerted from the anvil 94 to the hammer 98 when the anvil 94 counter-rotates the hammer 98. The predetermined torque range of the torque stick 100 may introduce a certain amount of inaccuracy as a workpiece may be torqued to a low end of the torque range or to a high end of the torque range in any given application.

With continued reference to FIG. 6, the torque stick 100 includes an anvil socket 166 disposed on the first end 158, a workpiece socket 170 disposed on the second end 162, and an elongated shaft 174 interconnecting the anvil socket 166 and the workpiece socket 170. The workpiece socket 170 is sized to receive a corresponding workpiece. In some embodiments, the workpiece socket 170 may include a standard drive (e.g., a square drive, etc.) that is capable of receiving different sized sockets, thereby allowing a user to select an appropriately sized socket for a given workpiece. In the illustrated embodiment, the cross-sectional area of the elongated shaft 174 through a plane perpendicular to the axis 154) is less than the cross-sectional area of the first end 158 and the second end 162. The thin geometry of the elongated shaft 174 concentrates the deflecting (or twisting) of the torque stick 100 within the shaft 174. The torque stick 100 of the illustrated embodiment is preferably composed of a high strength steel to provide the torque stick 100 with a sufficiently high rigidity, toughness, and elasticity. The anvil socket 166 preferably includes a means for rotationally locking the torque stick 100 to the anvil 94 (e.g., a tightening nut, bayonet-style connection, quick-disconnect sleeve, pin detent, friction ring, retaining ring, drafted profile, torsional wedging profile, cam lock, set screw, or the like), thereby reducing the amount of looseness or relative rotation (i.e., backlash) between the torque stick 100 and the anvil 94. The means may also axially secure the torque stick 100 to the anvil 94. In some embodiments, the workpiece socket 170 may also have a similar rotational locking means to secure the workpiece to the workpiece socket 170. One example of such a rotational locking means is a leaf spring detent mechanism 1500 illustrated in FIG. 29.

The torque stick 100 further includes a spring stiffness indicia 178 that corresponds to the spring stiffness k of the torque stick 100. The spring stiffness indicia 178 may also take into account other components of the impact wrench 10, such as the anvil 94 or other like component. In some embodiments, the spring stiffness indicia 178 may simply be a visual representation to indicate to a user the spring stiffness k of the torque stick 100. In other embodiments, the spring stiffness indicia 178 may be a bar code, a QR code, NFC tag, or the like that is scannable by the external device 150 for communicating to a user the spring stiffness k of the torque stick 100. In some embodiments, the impact wrench 10 may alternatively scan the spring stiffness indicia 178 via NFC reader, camera, bar code reader, or the like. Further, the torque stick 100 may be part of a set of torque sticks, with each torque stick having a separate spring stiffness k, enabling a user to apply different amounts of torque to various fasteners into various joints. In some embodiments, each torque stick of the set of torque sticks is separately used for a different torqueing application, while in other embodiments, each torque stick may be attached together in series to fine tune the amount of deliverable torque.

In operation of the impact wrench 10 without the torque stick 100, an operator depresses the switch 54 to activate the motor 42, which continuously drives the gear assembly 58 and the camshaft 86 via the output shaft 46. As the camshaft 86 rotates, the cam balls 118 drive the hammer 98 to co-rotate with the camshaft 86, and the hammer lugs 106 engage, respectively, the anvil lugs 110 to rotatably drive the anvil 94 and the tool attachment (represented as engagement 1 of FIG. 7). During operation, impacting occurs when the anvil 94 encounters a certain amount of resistance, e.g., when driving a workpiece. Specifically, impacting occurs when the reaction torque exerted on the anvil 94 exceeds the biasing force of the spring 102. At this point, the hammer 98 continues to rotate, while the anvil 94 stops rotating intermittently between each impact (represented as engagements 2-5 of FIG. 7). Specifically, the hammer 98 cams against the anvil 94, causing the hammer 98 to move or slide rearward along the camshaft 86 against the bias of the spring 102, away from the anvil 94, so that the hammer lugs 106 and the anvil lugs 110 are in the disengaged state. As the hammer 98 moves rearward, the cam balls 118 also move rearward in the cam grooves 114. The spring 102 stores some of the rearward energy of the hammer 98 to provide a return mechanism for the hammer 98. After the hammer lugs 106 disengage the respective anvil lugs 110, the hammer 98 continues to rotate and moves or slides forwardly, toward the anvil 94, as the spring 102 releases its stored energy, until the hammer lugs 106 and the anvil lugs 110 are in the engaged state to cause another impact. Impacting continues to occur so long as the reaction torque exerted on the anvil 94 exceeds the biasing force of the spring 102.

The controller 122 may calculate the drive angle A1 to control the motor 42 accordingly. A progressively decreasing drive angle A1 may be indicative that the workpiece is seated and no longer needs to be driven into the joint. Accordingly, when the drive angle A1 or the total drive angle A0 reaches a predetermined angle threshold, the controller 122 can control the motor 42 to deactivate. The anvil position sensor 126*a* can detect minor changes in the drive angle A1 of the anvil 94 (e.g., less than 5 degrees). The controller 122 may also calculate the amount of torque applied to the workpiece using the drive angle A1, the rebound angle A2, the total drive angle A0, or a combination thereof. The motor 42 may also be deactivated when a predetermined torque threshold is reached. In some embodiments, the controller 122 may alternatively adjust the motor 42 to a slower rotational speed when certain characteristics are met (e.g., the drive angle A1 is substantially equal to the predetermined angle threshold, the amount of torque is substantially equal to the predetermined torque threshold, etc.) to slowly approach the predetermined angle threshold or the predetermined torque threshold. Still, in other embodiments, the controller 122 may alternatively adjust the motor 42 to a higher rotational speed when certain characteristic are met to hold the drive angle A1 or the rebound angle A2 more constant, allowing high amounts of torque to be delivered quickly without over-torqueing the workpiece.

Figure 8:
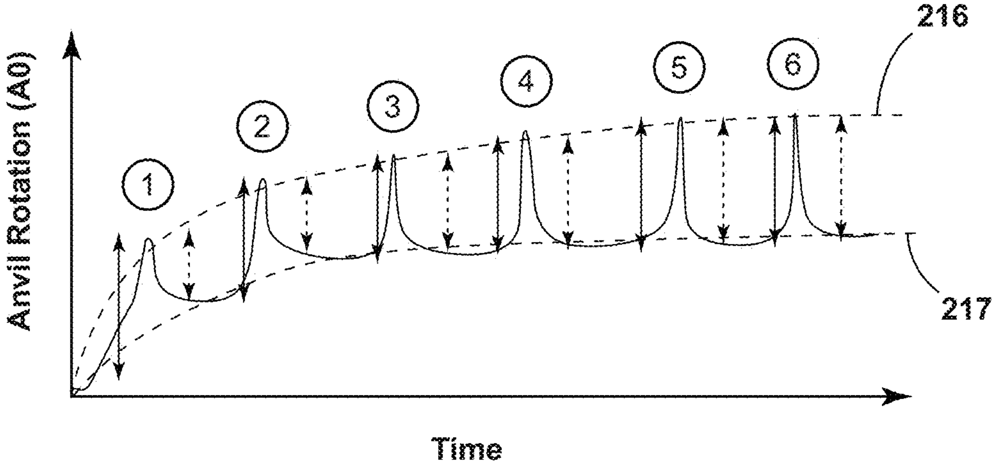
FIG. 8 is a graphical representation of the output signal from the anvil position sensor, illustrating the angular displacement of the anvil while the rotary impact tool is in operation with the torque stick attached to the anvil.

With reference to FIG. 8, the impact wrench 10 functions different when the torque stick 100 is attached to the anvil 94 and driving a workpiece. Specifically, the anvil position sensor 126*a* detects positive, clockwise rotation (as represented by an upward slope of the graph) of the anvil 94 when the hammer 98 is engaged and driving the anvil 94. Through the spring stiffness k of the torque stick 100, the first end 158 of the torque stick 100 (and the anvil 94) rotates relative to the second end 162 that is driving a workpiece. This extra rotation of the anvil 94 is detected by the anvil position sensor 126*a* as positive, clockwise rotation even though the workpiece is no longer being rotated into a joint. Eventually, the torque stick 100 stops deflecting (or twisting clockwise) and the hammer 98 cams against the anvil 94, at which point the hammer lugs 106 and the anvil lugs 110 transitions from the engaged state to the disengaged state. Once the hammer 98 and the anvil 94 are in the disengaged state, the anvil position sensor 126*a* detects negative, counterclockwise rotation (as represented by a downward slope of the graph) of the anvil 94. This is a result of the torque stick 100 rebounding, which exerts a biasing force to counter-rotate the anvil 94 through the rebound angle A2 when the hammer 98 is disengaged from the anvil 94. The rebound angle A2 is representative of the amount of torsion stored in the torque stick 100. Then, the spring 102 releases its stored energy, pushing the hammer 98 back toward the anvil 94 to transition the hammer lugs 106 and the anvil lugs 110 back to the engaged state to cause another impact. Although the overall angular displacement of the anvil 94 (and workpiece) increases after each impact, the amount of angular displacement becomes incrementally less from one impact to the next, until the torque stick 100 absorbs the entire rotation from the anvil 94 in accordance with the spring stiffness k of the torque stick 100.

For illustration purposes, the anvil 94 experiences an impact at the trough of engagement 2 of FIG. 8, where the solid arrow represents the positive, clockwise rotation of the anvil 94 from the impact. The peak of engagement 2 represents when the anvil 94 momentarily stops rotating (due to the reaction torque exerted on the anvil 94 by the torque stick 100 being equal to the applied torque from the hammer 98) just before transitioning to the disengaged state and counter-rotating. The dashed arrow represents the negative, counterclockwise rotation of the anvil 94 through the rebound angle A2 due to the torque stick 100 rebounding. This continues to occur at each subsequent impact (as represented by engagements 3-5 of FIG. 8), until the positive, clockwise rotation of the anvil 94 equals the negative, counterclockwise rotation of the anvil 94 (as represented by engagement 6 of FIG. 8). At this point, the torque stick 100 absorbs and rebounds the entire positive, clockwise rotation of the anvil 94 and the fastening sequence is complete. Accordingly, the amount of torque applied to the workpiece from the torque stick 100 is equivalent to the spring stiffness k of the torque stick 100 multiplied by the rebound angle A2.

Figure 10:
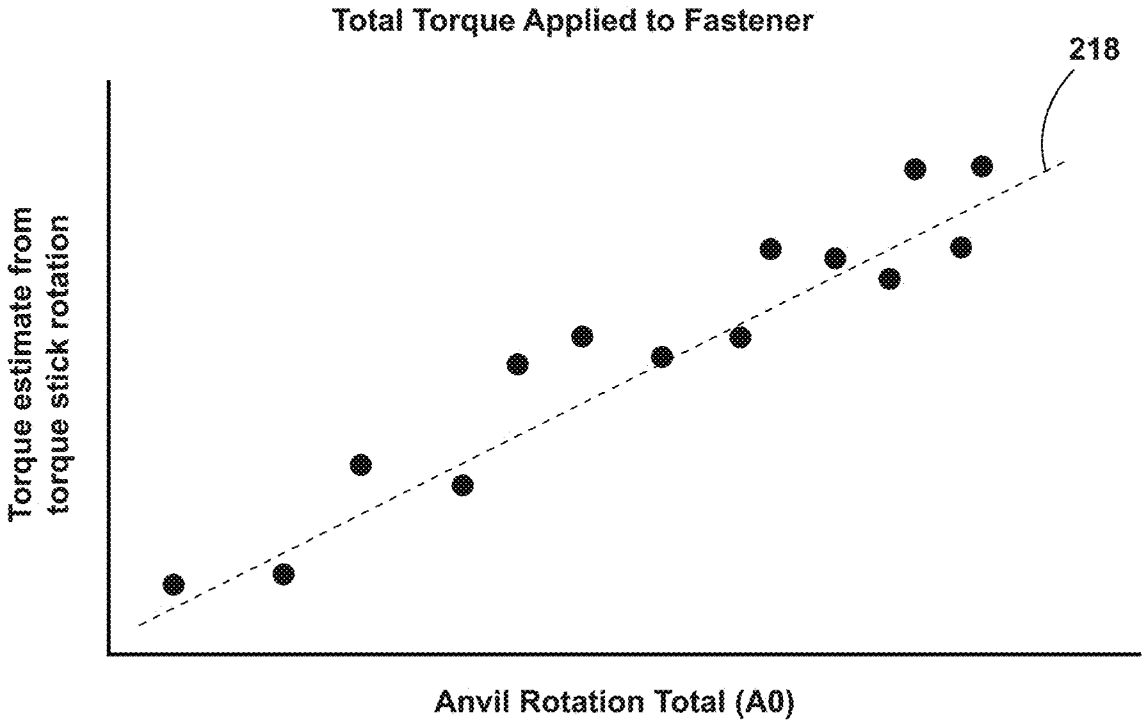
FIG. 10 is a graphical representation of the total torque applied to a workpiece during a fastener tightening operation.

The controller 122 may also calculate a bolt constant for a given workpiece, which is particularly useful to determine higher torques delivered to a workpiece. To determine the bolt constant, the controller first multiplies the drive angle A1 over multiple impacts by the spring stiffness k, the product of which is then divided by the angle through which the workpiece rotated. In other words, the bolt constant is determined by correlating the torque on the workpiece and the drive angle over multiple impacts using a controller (FIG. 10). At this point, the controller 122 may calculate the torque delivered to a workpiece by multiplying the bolt constant by the drive angle A1.

In some embodiments, the impact wrench 10 limits the negative, counterclockwise rotation of the anvil 94 caused from the torque stick 100 rebounding. Specifically, the anvil 94 can only rotate counterclockwise an amount that is equal to or less than the clockwise rotation of the anvil 94 after any given impact. In one such configuration, the drive assembly 62 may include a viscous layer that limits the amount of counterclockwise rotation of the anvil 94, while other configurations may limit counterclockwise rotation of the anvil 94 via torsional friction or eddy currents applied to the anvil 94. Still in other embodiments, the anvil 94 may simply be biased in a clockwise direction to resist the counterclockwise biasing force of the torque stick 100. For example, the impact wrench 10 may include a secondary rotating component in friction or torsional resistance with the anvil 94 (or torque stick 100, etc.) that may apply a torsional force to the anvil 94 after each impact.

The spring stiffness k of the torque stick 100 enables the impact wrench 10 to torque a workpiece within the predetermined torque range, as previously described herein. So, the amount of torque applied to the workpiece is not precise using the torque stick 100 alone. However, the impact wrench 10 of the illustrated embodiment enables a user to drive a workpiece into a joint to a precise torque limit while using the torque stick 100.

Figure 9:
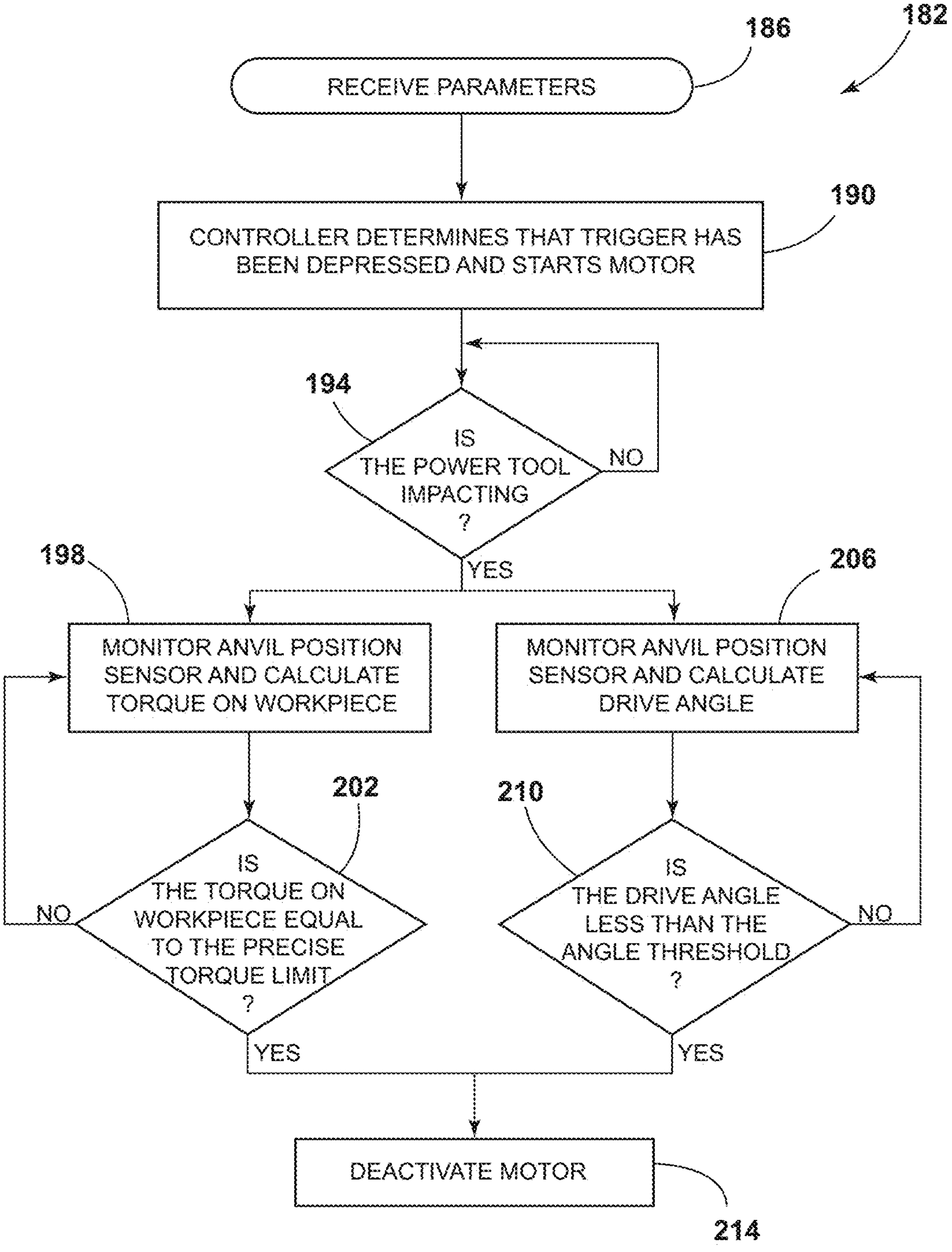
FIG. 9 illustrates a flowchart for controlling the rotary impact tool when the torque stick is attached to the anvil.

FIG. 9 illustrates a flowchart of a method 182 for driving a workpiece into a joint to a precise torque limit within the predetermined torque range while operating the impact wrench 10 with the torque stick 100. At block 186, the wireless communication controller 146 receives parameters and characteristics of the torque stick 100 from the external device 150. For example, a user can manually enter the spring stiffness k of the torque stick 100 into the external device 150 or a user can scan the spring stiffness indicia 178 using the external device 150 to automatically enter the spring stiffness k of the torque stick 100. In some embodiments, a user may also enter, at block 186, the type of workpiece being used, the joint type, the desired drive angle A1, the desired rebound angle A2, the desired total drive angle A0, and an estimation of the looseness between the anvil 94 and the torque stick 100. Although not illustrated, following block 186 there may be a calibration step where the impact wrench 10 jitters the anvil 94 clockwise and counterclockwise to detect the amount of looseness or relative rotation between the torque stick 100 and the anvil 94, so the controller 122 can account for any introduced looseness. At block 190, the controller 122 determines that the switch 54 has been depressed and starts the motor 42. At block 194, the controller 122 monitors motor characteristics to determine whether the impact wrench 10 is impacting. When the impact wrench 10 is not impacting, the method 182 remains at block 194 and the controller 122 continuously monitors motor characteristics. When the controller 122 determines that the impact wrench 10 is impacting, at block 198, the controller 122 calculates the torque applied to a workpiece after each impact by multiplying the spring stiffness k by the drive angle A1. The controller 122 may alternatively multiply the spring stiffness k by the total drive angle A0 to calculate the torque applied to a workpiece. Alternatively, the negative, counterclockwise rotation (i.e., rebound angle A2), the controller 122 may calculate the total torque applied to a workpiece throughout a fastening sequence by multiplying the spring stiffness k by the rebound angle A2. At block 202, the controller 122 compares the torque exerted on the workpiece to the precise torque limit programmed within the impact wrench 10 based on input characteristics of the torque stick 100.

With continued reference to FIG. 9, the controller 122 calculates the drive angle A1, at block 206, by subtracting the rebound angle A2 from the positive, clockwise rotation of the anvil 94. For example, the anvil position sensor **126*a* outputs to the controller 122 the positive, clockwise rotation of the anvil 94 after an impact, and subsequently outputs the rebound angle A2 to the controller 122 before the next impact. The controller 122 then calculates the difference between the positive, clockwise rotation of the anvil 94 and the rebound angle A2 of the anvil 94 to obtain the drive angle A1. Again, the drive angle A1 is equivalent to the number of degrees that the workpiece is rotated after each impact, whereas the total drive angle A0 is equivalent to the number of degrees that the workpiece is rotated after a fastening sequence is complete. Explained another way, the drive angle A1 from the impact of engagement 1 (FIG. 8) is calculated by subtracting the dashed arrow from the solid arrow. Similarly, the dashed arrow is subtracted from the solid arrow to calculate the drive angle A1 from the impact of engagement 2, engagement 3, and so on. In some embodiments, the controller 122 may alternatively calculate the drive angle A1 of the anvil 94 using the Hall sensor 126*b*, as previously described herein. Specifically, the controller 122 can subtract 180 degrees from the positive, clockwise rotation of the output shaft 46 and then further subtract the rebound angle A2. At block 210, the controller 122 compares the drive angle A1 or the total drive angle A0 to the predetermined angle threshold programmed within the impact wrench 10 based on characteristics of the joint type and fastener type. At block 214, the motor 42 is deactivated if the drive angle A1 or the total drive angle A0 of the anvil 94 (or the torque stick 100**, etc.) reaches the predetermined angle threshold, or if the torque exerted on the workpiece is equal to the precise torque limit.

In some embodiments, the controller 122 may also calculate the total drive angle A0 of a workpiece during a fastening sequence by modeling a curve fit line 217 using data points, as illustrated in FIG. 8. Alternatively, a proxy curve fit line 216 may be used that corresponds to extra rotation of the torque stick. Referring to FIG. 10, the controller 122 may also plot individual data points relating to the amount of torque exerted on the fastener after each impact and model a curve fit line 218 to interpolate the total amount of torque applied to the fastener. In other embodiments, the controller 122 may alternatively use a machine learning regression model (e.g., DNN, CNN, RNN, CNN/RNN, attention network, decision tree, a polynomial regression, etc.) to determine the total drive angle A0 or torque applied to a workpiece during a fastening sequence. Still, in other embodiments, the controller 122 may alternatively utilize individual data points relating to current, voltage, motor speed, camshaft rotation, hammer translation and rotation, or other parameters via a gyroscope and/or accelerometer to determine the total drive angle A0 or torque applied to a workpiece.

One key benefit of this precise torque limiting technique is that the impacts are so brief that any torque or angle calculation error introduced from a user rotating the impact wrench 10 are negligible. Technically, the torque and angle calculations may introduce error in a calculation if a user rotates the impact wrench 10 during operation. However, the signals from the sensors 126 are sent to the controller 122 after each impact, and the impacts occur so rapidly that any inadvertent rotation of the impact wrench 10 between impacts (and error introduced therefrom) are negligible. In some embodiments, the impact wrench 10 may include a motion sensor (e.g., gyroscope, accelerometer, etc.) to detect any inadvertent rotation of the impact wrench 10 itself and send a signal to the controller 122 to account for such movement.

Figure 11:
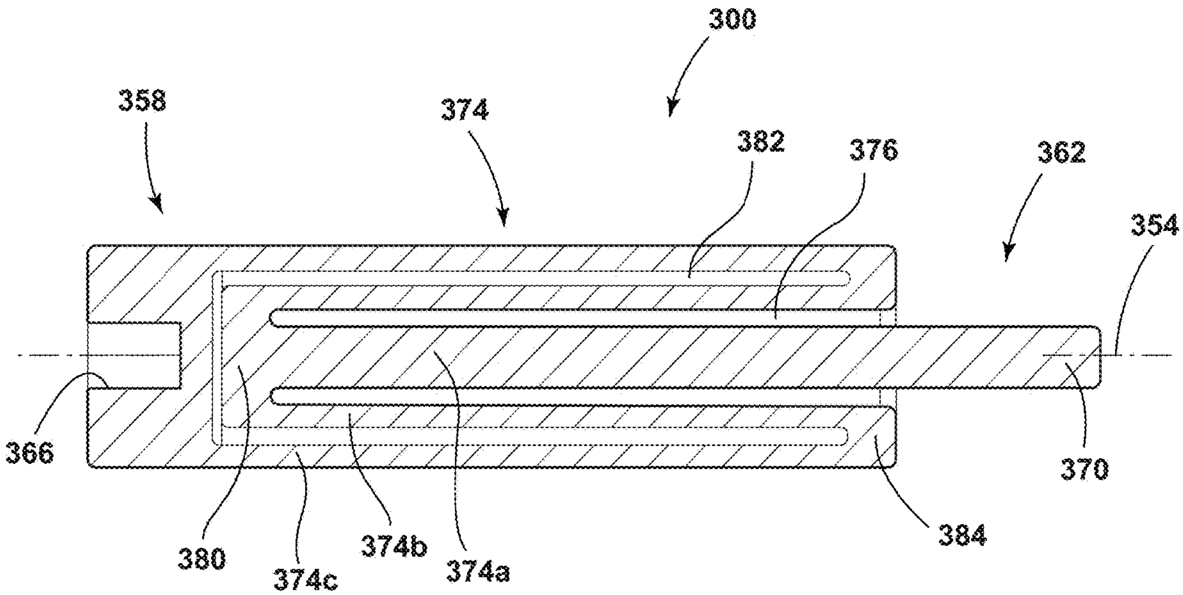
FIG. 11 is a cross-sectional view of a torque stick in accordance with another embodiment of the invention.

FIG. 11 illustrates a torque stick 300 according to another embodiment of the invention. The torque stick 300 shown in FIG. 11 is like the torque stick 100 shown in FIG. 7, with like structure being identified with like reference numerals plus "200."

With reference to FIG. 11, the torque stick 300 is attachable to the anvil 94 to limit the amount of torque delivered from the impact wrench 10 to a workpiece within a predetermined torque range. The torque stick 300 includes a first end 358 having an anvil socket 366, a second end 362 having a workpiece socket 370, and a body 374 that extends between the first end 358 and the second end 362. The body 374 includes a series of concentric bodies 374*a-c* that are co-axially aligned about a rotational axis 354. The first concentric body 374*a* is a shaft that extends along the rotational axis 354 and coupled to the workpiece socket 370. The second concentric body 374*b* is a cylindrical body that is disposed circumferentially around and spaced from the first concentric body 374*a*, such that an air gap 376 exists between the first and second concentric bodies 374*a*, 374*b*. A first base 380 couples the first and second concentric bodies 374*a*, 374*b* adjacent the first end 358. The third concentric body 374*c* is also a cylindrical body that is disposed circumferentially around and spaced from the second concentric body 374*b*, such that an air gap 382 exists between the second and third concentric bodies 374*b*, 374*c*. A second base 384 couples the second and third concentric bodies 374*b*, 374*c* adjacent the second end 362. The third concentric body 374*c* is coupled to the anvil socket 366. Explained another way, the body 374 serpentines circumferentially outward from the rotational axis 354, such that a plane oriented perpendicular to the rotational axis 354 intersects each of the concentric bodies 374*a-c*.

Although not shown, the torque stick 300 includes spring stiffness indicia that corresponds to the spring stiffness k of the torque stick 300. In some embodiments, the spring stiffness indicia may simply be a visual representation to indicate to a user the spring stiffness k of the torque stick 300. In other embodiments, the spring stiffness indicia may be a bar code, a QR code, NFC tag, or the like that is scannable by the external device 150 for communicating to a user the spring stiffness k of the torque stick 300.

During a fastening sequence, the torque stick 300 functions as a torsion spring when driving a workpiece, where that the torque stick 300 transfers rotational force from the anvil 94 to a workpiece while the torque stick 300 deflects (or twists) in response to the reaction torque from the workpiece in accordance with the spring stiffness k. When the torque stick 300 twists, each concentric body 374*a-c* deflects about the rotational axis 354. At this point, the amount of torque delivered to the workpiece is thereby limited because any additional torque delivered through the torque stick 300 is absorbed when the first end 358 twists relative to the second end 362. After torque is no longer applied to the torque stick 300, the torque stick 300 rebounds (or counter-rotates) the deflected amount.

The torque stick 300 is advantageous because the concentric bodies 374*a-c* enable the overall length of the torque stick 300 to be shortened. Also, the concentric bodies 374*a-c* are thin to enable ample deflection (or twisting) about the rotational axis 354, which increases resolution of the angular displacement detected by the anvil position sensor 126*a*. Although not shown, the torque stick 300 may include bearing surfaces between adjacent concentric bodies 374*a-c* to maintain coaxial alignment of the concentric bodies 374*a-c* with the rotational axis 354.

Figure 12:
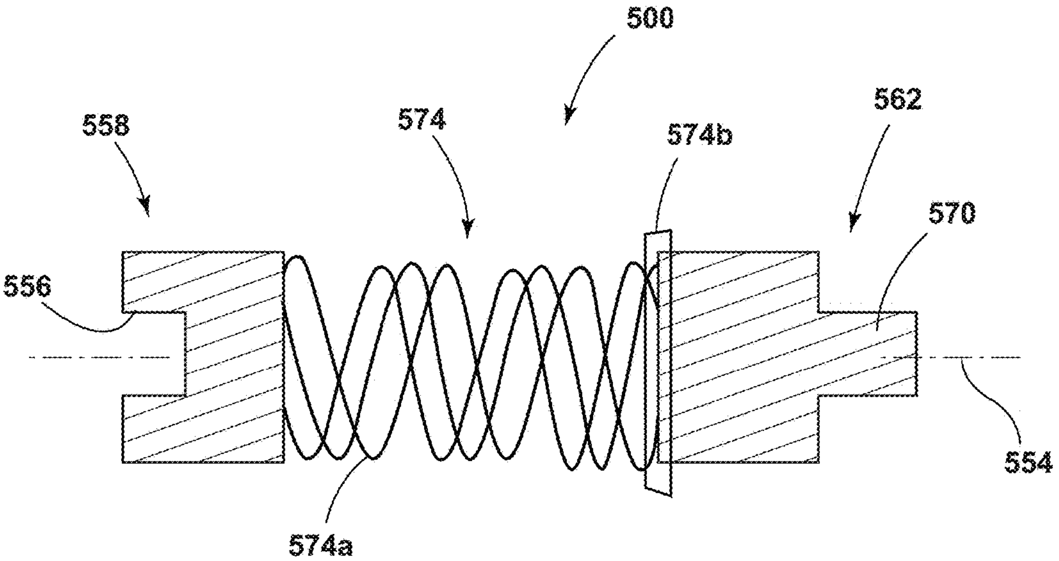
FIG. 12 is a plan view of a torque stick in accordance with yet another embodiment of the invention.

FIG. 12 illustrates a torque stick 500 according to another embodiment of the invention. The torque stick 500 shown in FIG. 12 is like the torque stick 100 shown in FIG. 7, with like structure being identified with like reference numerals plus "400."

With reference to FIG. 12, the torque stick 500 is attachable to the anvil 94 to limit the amount of torque delivered from the impact wrench 10 to a workpiece within a predetermined torque range. The torque stick 500 includes a first end 558 having an anvil socket 566, a second end 562 having a workpiece socket 570, and a body 574 that extends between the first end 558 and the second end 562 along a rotational axis 554. The body 574 includes a spring 574*a* that couples the first end 558 and the second end 562. The spring 574*a* allows the torque stick 500 to have greater deflection (or twist) when the reaction torque is exerted on torque stick 500, while also allowing the torque stick 500 to transfer rotational force from the anvil 94 to the workpiece. The greater deflection of the torque stick 500 provides greater resolution to the anvil position sensor 126*a*. The torque stick 500 may also be particularly advantageous in lighter torque applications, such as screw seating. Although the spring 574*a* of the illustrated embodiment is a coil spring, in other embodiments, the spring may be a compression spring, torsional spring or other flexible torsional member.

In some embodiments, the body 574 may also include a mechanical clutch 574*b*. The mechanical clutch 574*b* may be, for example, a friction clutch where the body 574 slips (i.e., the first end 558 rotates relative to the second end 562) when the reaction torque exerted on the torque stick 500 exceeds the frictional force of the friction clutch. The anvil position sensor 126*a* is capable of detecting when the friction clutch slips, at which point the controller 122 deactivates the motor 42.

Although not shown, the torque stick 500 includes spring stiffness indicia that corresponds to the spring stiffness k of the torque stick 500. In some embodiments, the spring stiffness indicia may simply be a visual representation to indicate to a user the spring stiffness k of the torque stick 500. In other embodiments, the spring stiffness indicia may be a bar code, a QR code, NFC tag, or the like that is scannable by the external device 150 for communicating to a user the spring stiffness k of the torque stick 500.

During a fastening sequence, the torque stick 500 functions as a torsion spring when driving a workpiece, where the torque stick 500 transfers rotational force from the anvil 94 to a workpiece while the torque stick 500 deflects (or twists) in response to the reaction torque from the workpiece in accordance with the spring stiffness k. Accordingly, the amount of torque delivered to the workpiece is thereby limited because any additional torque delivered through the torque stick 500 is absorbed by the spring 574*a* and the clutch 574*b*.

Figure 13:
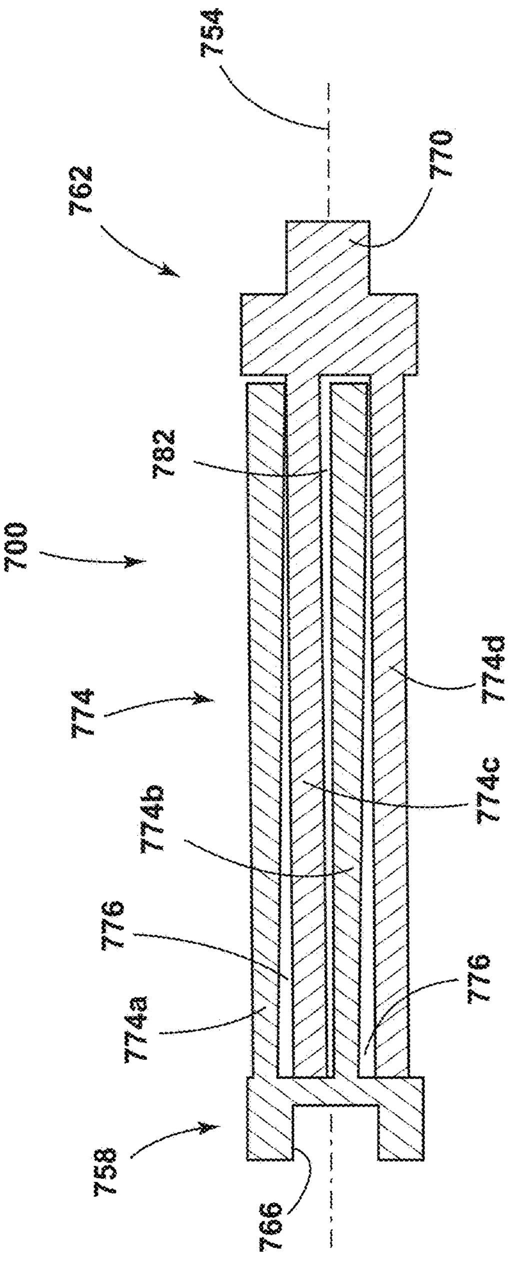
FIG. 13 is a plan view of a torque stick in accordance with still yet another embodiment of the invention, illustrating the torque stick in a retracted position.
Figure 14:
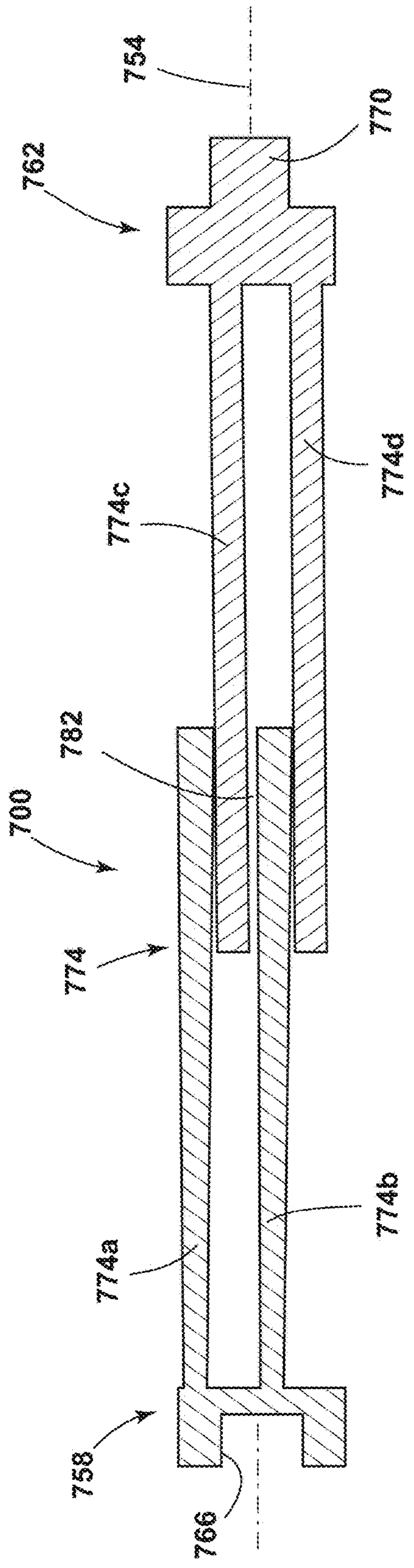
FIG. 14 is a plan view of the torque stick of FIG. 13, illustrating the torque stick in an extended position.

FIGS. 13-14 illustrate a torque stick 700 according to another embodiment of the invention. The torque stick 700 shown in FIGS. 13-14 is like the torque stick 100 shown in FIG. 7, with like structure being identified with like reference numerals plus "600."

With reference to FIGS. 13 and 14, the torque stick 700 is attachable to the anvil 94 to limit the amount of torque delivered from the impact wrench 10 to a workpiece within a predetermined torque range. The torque stick 700 includes a first end 758 having an anvil socket 766, a second end 762 having a workpiece socket 770, and a body 774 that extends between the first end 758 and the second end 762 along a rotational axis 754. The body 774 includes a series of elongated bodies 774*a-d* that mechanically interface with each other. Specifically, the elongated bodies 774*a*, 774*b* are coupled to the anvil socket 766 and extend toward the second end 762. The other elongated bodies 774*c*, 774*d* are coupled to the workpiece socket 770 and extend toward the first end 758. The elongated bodies 774*a*, 774*b* mesh and overlap with elongated bodies 774*c*, 774*d*. As illustrated, the elongated bodies 774*a*, 774*b* have a planar face on one side and a curved face on the other side, whereas the elongated bodies 774*c*, 774*d* have planar faces on both sides. An air gap 776 exists between the curved face of the elongated bodies 774*a*, 774*b* and the planar faces of the elongated bodies 774*c*, 774*d*. An air gap 782 also exists between the planar face of the elongated body 774*b* and the planar face of the elongated body 774*c*.

Although not shown, the torque stick 700 includes a spring stiffness indicia that corresponds to the spring stiffness k of the torque stick 700. In some embodiments, the spring stiffness indicia may simply be a visual representation to indicate to a user the spring stiffness k of the torque stick 700. In other embodiments, the spring stiffness indicia may be a bar code, a QR code, NFC tag, or the like that is scannable by the external device 150 for communicating to a user the spring stiffness k of the torque stick 700. Still, in some embodiments, the spring stiffness indicia may alternatively correspond to a spring rate if, for example, the spring stiffness k is nonlinear.

Figure 15:
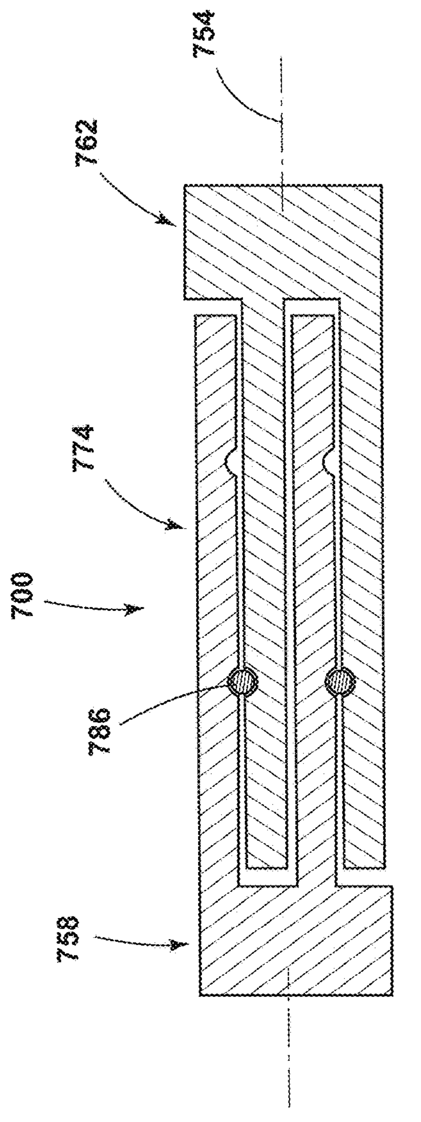
FIG. 15 is a plan view of a torque stick in accordance with yet another embodiment of the invention, illustrating the torque stick in a retracted position.
Figure 16:
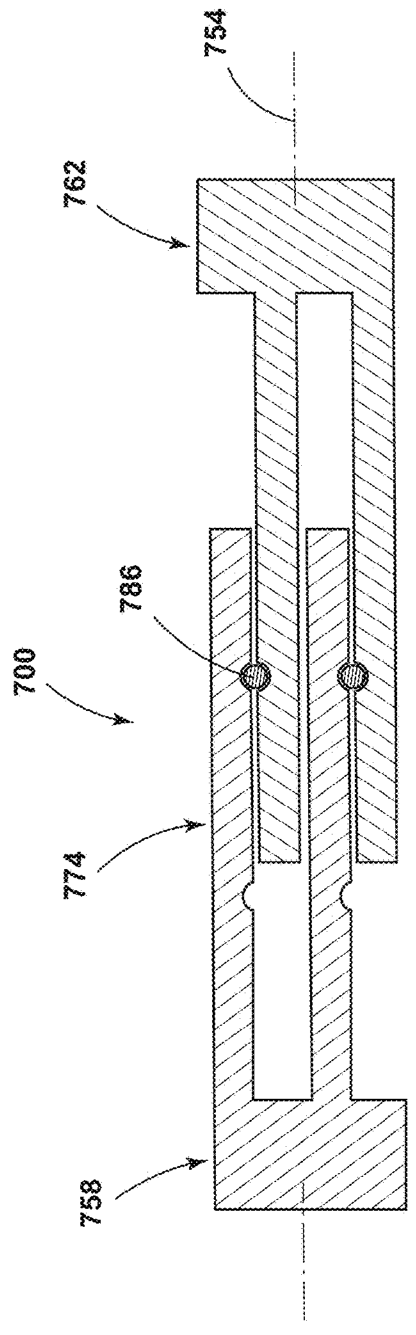
FIG. 16 is a plan view of the torque stick of FIG. 15, illustrating the torque stick in an extended position.

Furthermore, the body 774 is moveable between a retracted position (FIG. 13) and an extended position (FIG. 14). With reference to FIGS. 15-16, the torque stick 700 may include a pin detent 786 (or similar quick disconnect coupling) to maintain the body 774 in the retracted position (FIG. 15) and the extended position (FIG. 16). In some embodiments, the body 774 is moveable between the retracted position and the extended position via a threaded mechanism or the like to permit fine or coarse axial adjustments. The spring stiffness k of the torque stick 700 increases as you move from the extended position to the retracted position, as explained in further detail below.

During a fastening sequence, the torque stick 700 functions as a torsion spring when driving a workpiece, such that the torque stick 700 transfers rotational force from the anvil 94 to a workpiece while the reaction torque exerted on the torque stick 700 causes the torque stick 700 to deflect (or twist) according to the spring stiffness k. Specifically, the elongated bodies 774*a*, 774*b* transfer rotational force to the elongated bodies 774*c*, 774*d* along a contact interface between the curved face of the elongated bodies 774*a*, 774*b* and the planar face of the elongated bodies 774*c*, 774*d*. As the reaction torque exerted on the torque stick 700 increases, the elongated bodies 774*c*, 774*d* exert a force and gradually deforms the elongated bodies 774*a*, 774*b*, until the curved face of the elongated bodies 774*a*, 774*b* is nearly entirely in contact with the planar face of the elongated bodies 774*c*, 774*d*, thereby increasing the contact interface. In other words, the amount of friction increases linearly between the elongated bodies 774*a*, 774*b* and the elongated bodies 774*c*, 774*d* as the contact interface increases, thereby linearly increasing the amount of deliverable torque through the torque stick 700. Also, the air gap 776 no longer exists when the elongated bodies 774*a*, 774*b* and the elongated bodies 774*c*, 774*d* are entirely in contact. At this point, the torque stick 700 has absorbed the rotation of the anvil 94 by deflecting in response to the reaction torque from the workpiece in accordance with the spring stiffness k. The contact interface is limited when the body 774 is moved to the extended position, and thus, the spring stiffness k is lower and the amount of deliverable torque through the torque stick 700 is lower.

During a reverse fastening sequence, the air gap 782 closes immediately and the rotational force from the elongated bodies 774*a*, 774*b* is immediately transferred to the elongated bodies 774*c*, 774*d*. The elongated bodies 774*a*-*d* make a positive, direct contact, where torque in the reverse direction is only limited by the impact wrench 10 itself.

FIGS. 17A-22 illustrate a torque stick 900 according to another embodiment of the invention. The torque stick 900 shown in FIGS. 17A-21 is like the torque stick 100 shown in FIG. 7, with like structure being identified with like reference numerals plus "800."

Figure 17A:
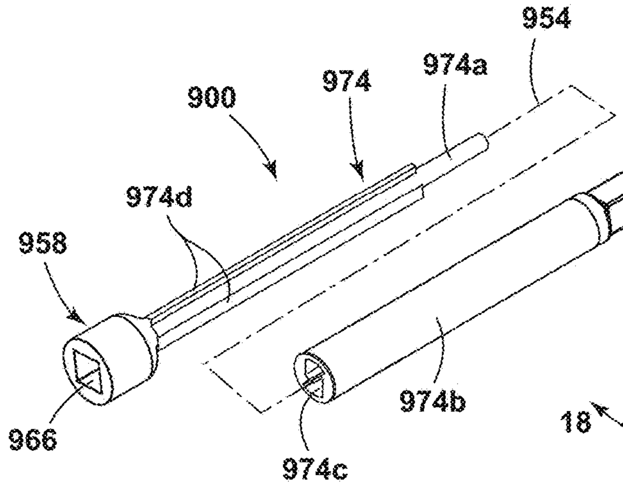
FIG. 17A is an exploded view of a torque stick in accordance with still yet another embodiment of the invention.
Figure 17B:
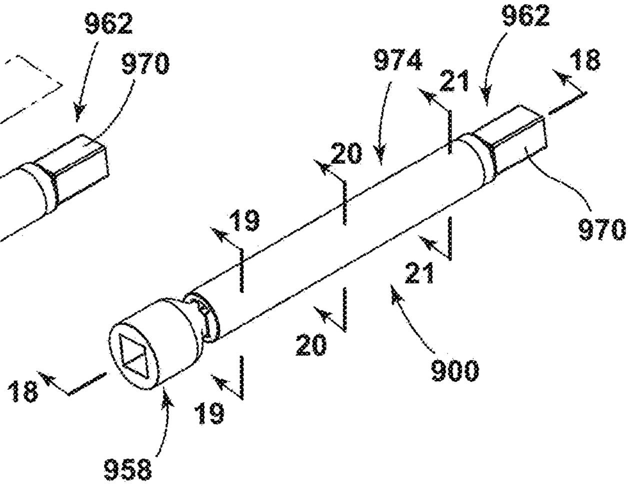
FIG. 17B is a perspective view of the torque stick of FIG. 17A, illustrating the torque stick in a retracted position.
Figure 18:
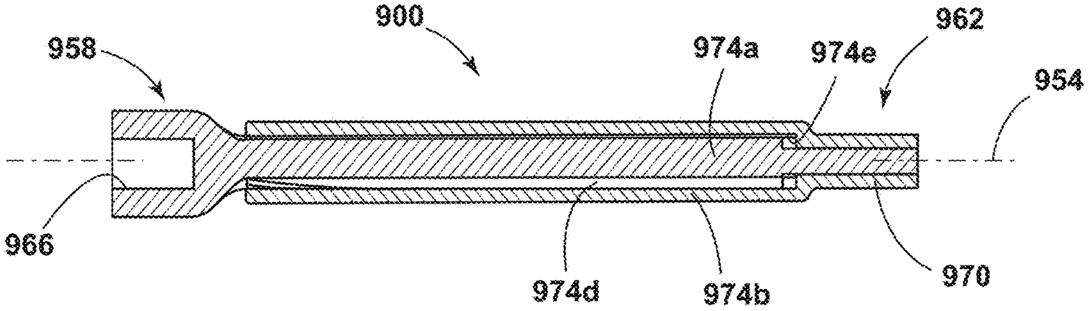
FIG. 18 is a cross-sectional view of the torque stick taken along line 18-18 of FIG. 17B.
Figure 19:
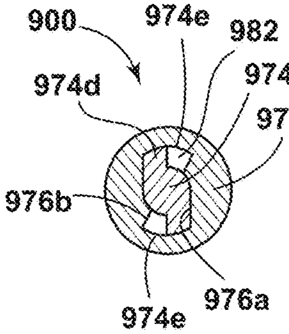
FIG. 19 is a cross-sectional view of the torque stick taken along line 19-19 of FIG. 17B.
Figure 20:
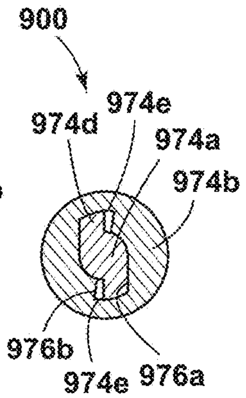
FIG. 20 is a cross-sectional view of the torque stick taken along line 20-20 of FIG. 17B.
Figure 21:
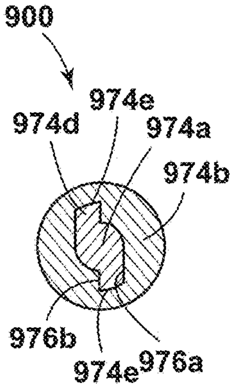
FIG. 21 is a cross-sectional view of the torque stick taken along line 21-21 of FIG. 17B.

With reference to FIGS. 17A-21, the torque stick 900 is attachable to the anvil 94 to limit the amount of torque delivered from the impact wrench 10 to a workpiece within a predetermined torque range. The torque stick 900 includes a first end 958 having an anvil socket 966, a second end 962 having a workpiece socket 970, and a body 974 that extends between the first end 958 and the second end 962 along a rotational axis 954 (FIGS. 17A, 17B, and 18). The body 974 includes a shaft 974*a* coupled to the anvil socket 966 and a sleeve 974*b* coupled to the workpiece socket 970. The shaft 974*a* and the sleeve 974*b* mechanically interface with each other. Specifically, the shaft 974*a* is received and in sliding engagement within a slot 974*c* of the sleeve 974*b*. As illustrated, the shaft 974*a* includes a pair of tabs 974*d* that extend along the shaft 974*a* in a direction parallel with the rotational axis 954. The tabs 974*d* also extend tangentially away from the body of the shaft 974*a* (FIGS. 19-21). The tabs 974*d* are received within corresponding lobes 974*e* of the slot *c*. Although the slot 974*c* is illustrated with two lobes 974*e* (FIGS. 19-21), in other embodiments, the slot 974*c* may alternatively have four or more lobes (FIG. 22) for purposes of distributing stress evenly on the sleeve 974*b*. Each lobe 974*e* includes a reverse stop wall 976*a* and a forward stop wall 976*b* (FIGS. 19-21). The reverse stop wall 976*a* extends along a direction parallel with the rotational axis 954, while the forward stop wall 976*b* extends along a helically pitched path about the rotational axis 954. In other words, the forward stop wall 976*b* spirals or corkscrews around the rotational axis 954. In this embodiment, the forward stop wall 976*b* has a constant rate of curvature from zero degrees (FIG. 21) to approximately 20 to 40 degrees (FIG. 19). Specifically, the forward stop wall 976*b* has a constant curvature from zero degrees (FIG. 21) to approximately 30 degrees (FIG. 19). As shown in FIG. 21, the forward stop wall 976*b* is at zero degrees of curvature adjacent the second end 962, whereas the forward stop wall 976*b* is at approximately 30 degrees of curvature adjacent the first end 958, as shown in FIG. 19. In some embodiments, the forward stop wall 976*b* includes a variable pitched helix profile. In such an embodiment, for example, the forward stop wall 976*b* may have variable rates of curvature within the pitched helix profile, or the forward stop wall 976*b* may have a partial pitched helix profile in combination with a linear flat profile.

The torque stick 900 further includes an air gap 982 that exists between portions of the shaft 974*a* and the slot 974*c*. Specifically, the air gap 982 exists between the shaft 974*a* and the slot 974*c* adjacent the first end 958 (FIG. 19), while there is no air gap that exists between the shaft 974*a* and the slot 974*c* adjacent the second end 962 (FIG. 21). The shaft 974*a* is rotatable between a first position (FIG. 19), in which the shaft 974*a* is not deflected (or twisted), and a second position (not shown), in which the shaft 974*a* is deflected (or twisted) about the rotational axis 954. The shaft 974*a* is in the first position when the impact wrench 10 is operated in a reverse fastening sequence and when the torque stick 900 is not experiencing any reaction torque. When the shaft 974*a* is in the first position, the air gap 982 exists between the tabs 974*d* and the forward stop wall 976*b* (FIG. 19). Accordingly, the tabs 974*d* of the shaft 974*a* are in direct contact with the reverse stop wall 976*a* when the shaft 974*a* is in the first position. When the shaft 974*a* is twisted toward the second position, the air gap 782 shifts to a location between the tabs 974*d* and the reverse stop wall 976*a* (not shown). Accordingly, the tabs 974*d* of the shaft 974*a* are very close to the forward stop wall 976*b* (but not in contact) when the shaft 974*a* is in the second position. In one embodiment, the helical pitch profile of the forward stop wall 976*b* is designed in such a way that the tabs 974*d* avoid being entirely in contact with the forward stop wall 976*b*. If the tabs 974*d* of the shaft 974*a* are in contact with the entirety of the forward stop wall 976*b*, the spring stiffness k of the torque stick 900 increases exponentially, such that the torque stick 900 would inadvertently function as a rigid (i.e., non-twistable) shaft.

Although not shown, the torque stick 900 includes a spring stiffness indicia that corresponds to the spring stiffness k of the torque stick 900. In some embodiments, the spring stiffness indicia may simply be a visual representation to indicate to a user the spring stiffness k of the torque stick 900. In other embodiments, the spring stiffness indicia may be a bar code, a QR code, NFC tag, or the like that is scannable by the external device 150 for communicating to a user the spring stiffness k of the torque stick 900.

Furthermore, the body 974 may be moveable between a retracted position (FIGS. 17B and 18) and an extended position (not shown). The torque stick 900 may include the pin detent 786 (or similar quick disconnect coupling) to maintain the body 974 in the retracted position and the extended position. The spring stiffness k of the torque stick 900 increases as you move from the extended position to the retracted position.

During a fastening sequence, the torque stick 900 functions as a torsion spring when driving a workpiece, such that the torque stick 900 transfers rotational force from the anvil 94 to a workpiece while the reaction torque exerted on the torque stick 900 causes the torque stick 900 to deflect (or twist) according to the spring stiffness k. Specifically, the shaft 974*a* transfers rotational force to the sleeve 974*b* along a contact interface between the tabs 974*d* and the lobes 974*c*. At the beginning of the fastening sequence (when reaction torque is relatively low), the shaft 974*a* is in the first position, such that the tabs 974*d* are only in contact with the forward stop wall 976*b* near the second end 962 and spaced away from the forward stop wall 976*b* near the first end 958. As such, the air gap 982 is between the tabs 974*d* and the forward stop wall 976*b* at the first end 958. When the shaft 974*a* is in the first position, there is a small amount of contact interface between the tabs 974*d* and the lobes 974*c*. As the reaction torque exerted on the torque stick 900 increases, the shaft 974*a* deflects (or twists) within the slot 974*c*, such that the contact interface gradually increases between the tabs 974*d* and the forward stop wall 976*b*. That is, the tabs 974*d* begin contacting the forward stop wall 976*b* in a gradual manner moving from the second end 962 toward the first end 958. As the contact interface increases between the shaft 974*a* and the sleeve 974*b*, the amount of deliverable torque through the torque stick 900 also increases. As the torque stick 900 deflects (or twists) through the spring stiffness k, the air gap 982 is now located between the tabs 974*d* and the reverse stop wall 976*a*, where the tabs 974*d* are mostly in contact with the forward stop wall 976*b*. The amount of torque delivered to the workpiece is limited because the deflection (twisting) of the torque stick 900 absorbs torque from the anvil 94.

During a reverse fastening sequence, the entirety of the tabs 974*d* are already in direct contact with the reverse stop wall 976*a* of the lobes 974*c*. This allows the full rotational force of the anvil 94 to be immediately transferred from the shaft 974*a* to the sleeve 974*b*. Accordingly, the torque stick 900 acts as a rigid shaft in the reverse fastening sequence.

Figure 23:
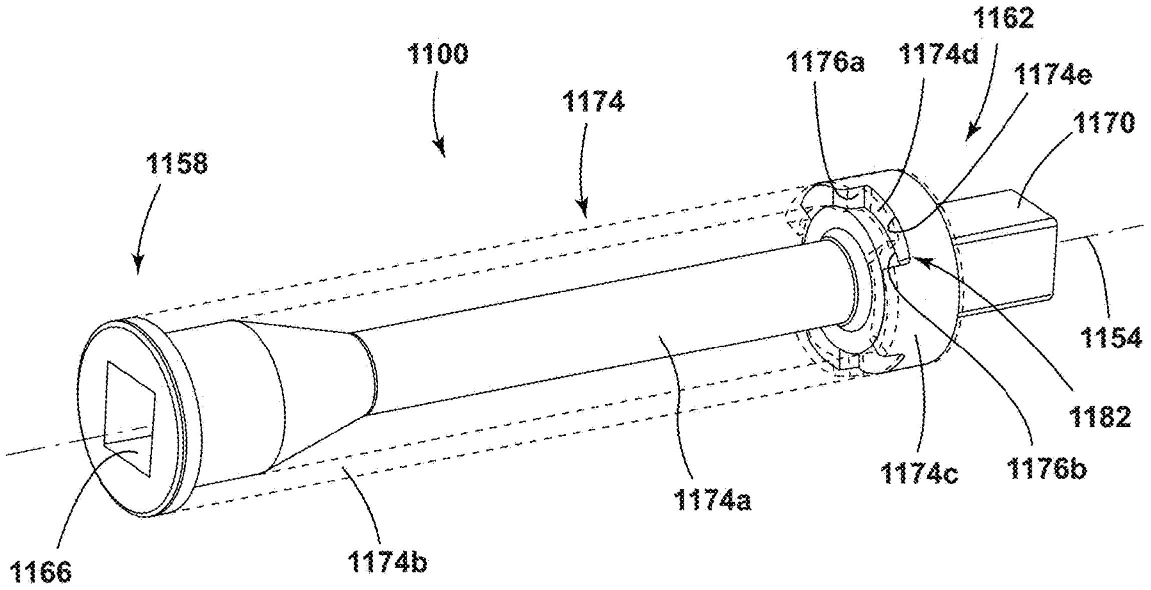
FIG. 23 is a perspective view of a torque stick in accordance with still yet another embodiment of the invention.

FIG. 23 illustrates a torque stick 1100 according to another embodiment of the invention. The torque stick 1100 shown in FIG. 23 is like the torque stick 100 shown in FIG. 7, with like structure being identified with like reference numerals plus "1000."

With reference to FIG. 23, the torque stick 1100 is attachable to the anvil 94 to limit the amount of torque delivered from the impact wrench 10 to a workpiece within a predetermined torque range. The torque stick 1100 includes a first end 1158 having an anvil socket 1166, a second end 1162 having a workpiece socket 1170, and a body 1174 that extends between the first end 1158 and the second end 1162 along a rotational axis 1154. The body 1174 includes a shaft 1174*a*, and a sleeve 1174*b* and a stop nut 1174*c* both of which are circumferentially disposed around the shaft 1174*a*. In this embodiment, the sleeve 1174*b* is rigidly coupled (e.g., welded) to the first end 1158 of the torque stick 1100 and the stop nut 1174*c* is rigidly coupled (e.g., welded) to the second end 1162 of the torque stick 1100. In other embodiments, the sleeve 1174*b* and the stop nut 1174*c* may alternatively be rigidly coupled (e.g., welded) at a different location on the torque stick 1100. The sleeve 1174*b* includes tabs 1174*d* that project toward and interlock with corresponding slots 1174*c* of the stop nut 1174*c*. Each slot 1174*e* includes a reverse stop wall 1176*a* and a forward stop wall 1176*b*. In an alternative embodiment (not shown), the torque stick 1100 may have tabs 1174*d* and slots 1174*c* at both ends 1158, 1162, such that the sleeve 1174*b* is not rigidly coupled to the shaft 1174*a*.

The torque stick 1100 further includes an air gap 1182 that exists between the tabs 1174*d* and the slots 1174*c*, as will be explained in more detail. The shaft 1174*a* is rotatable between a first position (FIG. 23), in which the shaft 1174*a* is not deflected (or twisted), and a second position (not shown), in which the shaft 1174*a* is deflected (or twisted) about the rotational axis 1154. The shaft 1174*a* is in the first position when the impact wrench 10 is operated in a reverse fastening sequence and when the torque stick 1100 is not experiencing any reaction torque. When the shaft 1174*a* is in the first position, the sleeve 1174*b* is also in the first position because the shaft 1174*a* and the sleeve 1174*b* co-rotate. In the first position, the air gap 1182 exists between the tabs 1174*d* and the forward stop wall 1176*b* (FIG. 23). At this point, the tabs 1174*d* of the sleeve 1174*b* are in direct contact with the reverse stop wall 1176*a*. When the shaft 1174*a* (and therefore the sleeve 1174*b*) is in the second position, the air gap 1182 shifts to a location between the tabs 1174*d* and the reverse stop wall 1176*a* (not shown). Accordingly, the tabs 1174*d* of the sleeve 1174*b* are very close to the forward stop wall 1376*b* (but not in contact) when the shaft 1174*a* is in the second position. In one embodiment, the forward stop wall 1176*b* should be designed is such a way that the tabs 1174*d* avoid contacting the forward stop wall 1376*b*. If the tabs 1174*d* are in contact with the forward stop wall 1176*b*, the spring stiffness k of the torque stick 1100 increases exponentially such that the torque stick 1100 would inadvertently function as a rigid shaft.

Although not shown, the torque stick 1100 includes a spring stiffness indicia that corresponds to the spring stiffness k of the torque stick 1100. In some embodiments, the spring stiffness indicia may simply be a visual representation to indicate to a user the spring stiffness k of the torque stick 1100. In other embodiments, the spring stiffness indicia may be a bar code, a QR code, NFC tag, or the like that is scannable by the external device 150 for communicating to a user the spring stiffness k of the torque stick 1100.

During a fastening sequence, the torque stick 1100 functions as a torsion spring when driving a workpiece, such that the torque stick 1100 transfers rotational force from the anvil 94 to a workpiece while the reaction torque exerted on the torque stick 1100 causes the torque stick 900 to deflect (or twist) according to the spring stiffness k. At the beginning of the fastening sequence (when reaction torque is relatively low), the shaft 1174*a* is in the first position, such that the tabs 1174*d* are only in contact with the reverse stop wall 1176*a*. At this point, the air gap 1182 is disposed between the tabs 1174*d* and the forward stop wall 1176*b*. The sleeve 1174*b* co-rotates with the shaft 1174*a* due to the rigid connection therebetween when the shaft 1174*a* transfers rotational force to the sleeve 1174*b*. As the reaction torque exerted on the torque stick 1100 increases, the shaft 1174*a* (and therefore the sleeve 1174*b*) twists, such that the tabs 1174*d* rotate toward the forward stop wall 1176*b*. As the tabs 1174*d* become increasingly close to the forward stop wall 1176*b*, the amount of deliverable torque through the torque stick 1100 increases. At this point, the air gap 1182 is now located between the tabs 1174*d* and the reverse stop wall 1176*a* (not shown). The amount of torque delivered to the workpiece is limited because the deflection (twisting) of the torque stick 1100 absorbs torque from the anvil 94.

During a reverse fastening sequence, the tabs 1174*d* are already in direct contact with the reverse stop wall 1176*a* of the slots 1174*c*. This allows full rotational force from the anvil 94 to be immediately transferred through the body 1174. Accordingly, the torque stick 1100 functions as a rigid shaft in the reverse fastening sequence.

Although not shown, in some embodiments the shaft 1174*a* is deflected (or twisted) in a clockwise direction during assembly of the torque stick 1100 to provide the torque stick 1100 with a preload on the spring stiffness k. Specifically, the first end 1158 is twisted (biased) in a clockwise direction relative to the second end 1162, at which point the sleeve 1174*b* and the stop nut 1174*c* are welded to the respected ends 1158, 1162. The shaft 1174*a* remains twisted (biased) in a clockwise direction as a result of the mechanical interference between the tabs 1174*d* of the sleeve 1174*b* and the reverse stop wall 1176*a* of the slots 1174*e* to prevent the shaft 1174*a* from rebounding. The preload is advantageous because it enables the spring stiffness k to be decreased without detriment to the overall energy absorption capacity of the torque stick 1100. With a lower spring stiffness k, the deflection capacity of the torque stick 1100 is increased, which increases resolution of the angular displacement detected by the anvil position sensor 126*a*. As such, the preload improves torque measurements, which ultimately, provides increased control over the torque applied to a workpiece.

Figure 24:
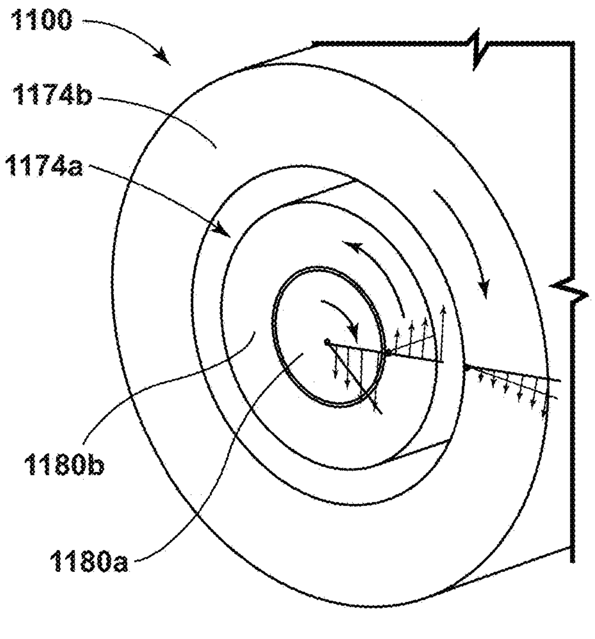
FIG. 24 is a cross-sectional view of a torque stick in accordance with still yet another embodiment of the invention.
Figure 25:
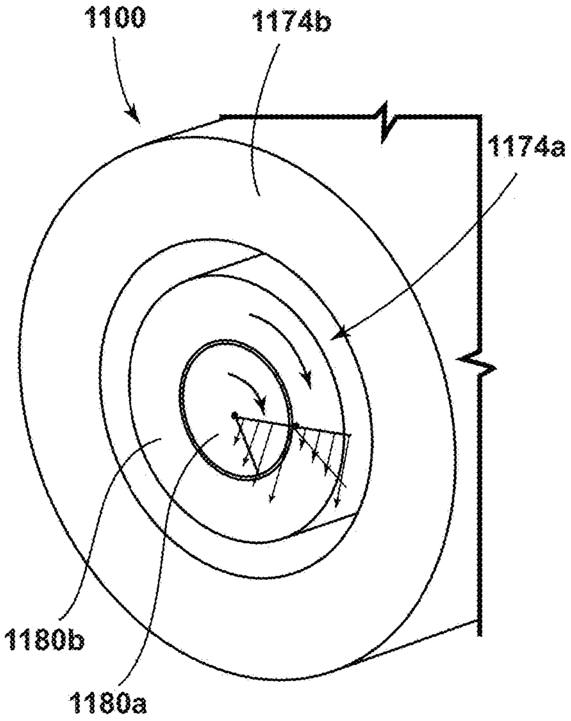
FIG. 25 is a cross-sectional view of the torque stick of FIG. 24.

With reference to FIGS. 24 and 25, the shaft 1174*a* may alternatively be composed of two or more separate concentric bodies 1180*a*, 1180*b* to increase the longevity of the shaft 1174*a* against shear stress-strain and avoid inadvertent failure of the shaft 1174*a*. To provide some background, shear stress-strain on a shaft is caused by torsional loads (i.e., when a force is applied tangentially to an area). The torsion, or twist, induced when torque is applied to a shaft causes a distribution of shear stress-strain over the shaft's cross-sectional area, with zero shear stress-strain at the center of the shaft and maximum shear stress-strain at the outer radius of the shaft.

With the shaft 1174*a* being composed of the separate concentric bodies 1180*a*, 1180*b*, the shear stress-strain is distributed evenly across each body 1180*a*, 1180*b*, rather than being distributed through a single shaft 1174*a*. This is advantageous when the shaft 1174*a* is preloaded (i.e., already twisted prior to experiencing any further torque). As illustrated in FIG. 24, the inner body 1180*a* is preloaded (or twisted) in a clockwise direction and the outer body 1180*b* is preloaded (or twisted) in a counterclockwise direction. The concentric bodies 1180*a*, 1180*b* are welded together to maintain their competing torsional relationship. Also, during assembly, the sleeve 1174*b* is welded to the shaft 1174*a* being preloaded (or twisted) in a clockwise direction, thereby causing the sleeve 1174*b* to be preloaded as well.

With reference to FIG. 25, when the torque stick experiences a reaction torque, the sleeve 1174*b* preload dissipates as the tabs 1174*d* no longer contact the reverse stop wall 1176*a*. Simultaneously, the inner body 1180*a* rotates further in the clockwise direction and the outer body 1180*b* rebounds and rotates in the clockwise direction. As illustrated, the sleeve 1174*b* no longer experiences any shear stress-strain, while the concentric bodies 1180*a*, 1180*b* share the shear stress-strain from the reaction torque.

Figure 22:
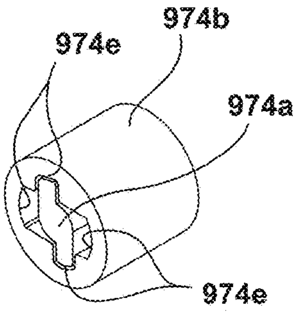
FIG. 22 is a cross-sectional view of a torque stick in accordance with still yet another embodiment of the invention.
Figure 26:
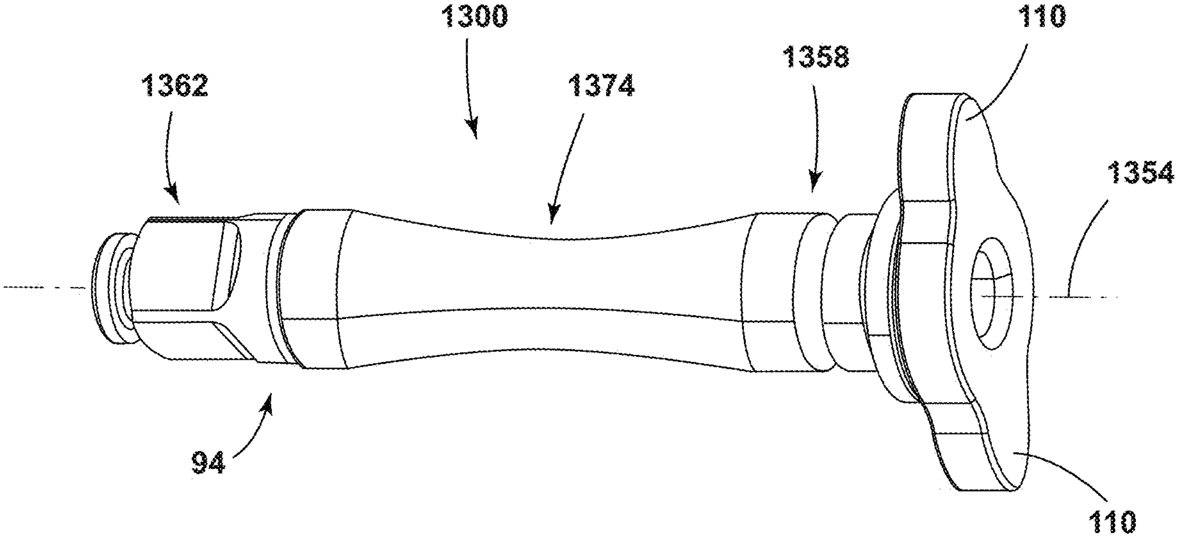
FIG. 26 is a perspective view of an anvil in accordance with another embodiment of the invention for use with a rotary impact tool, illustrating a torque stick integrated with the anvil.
Figure 27:
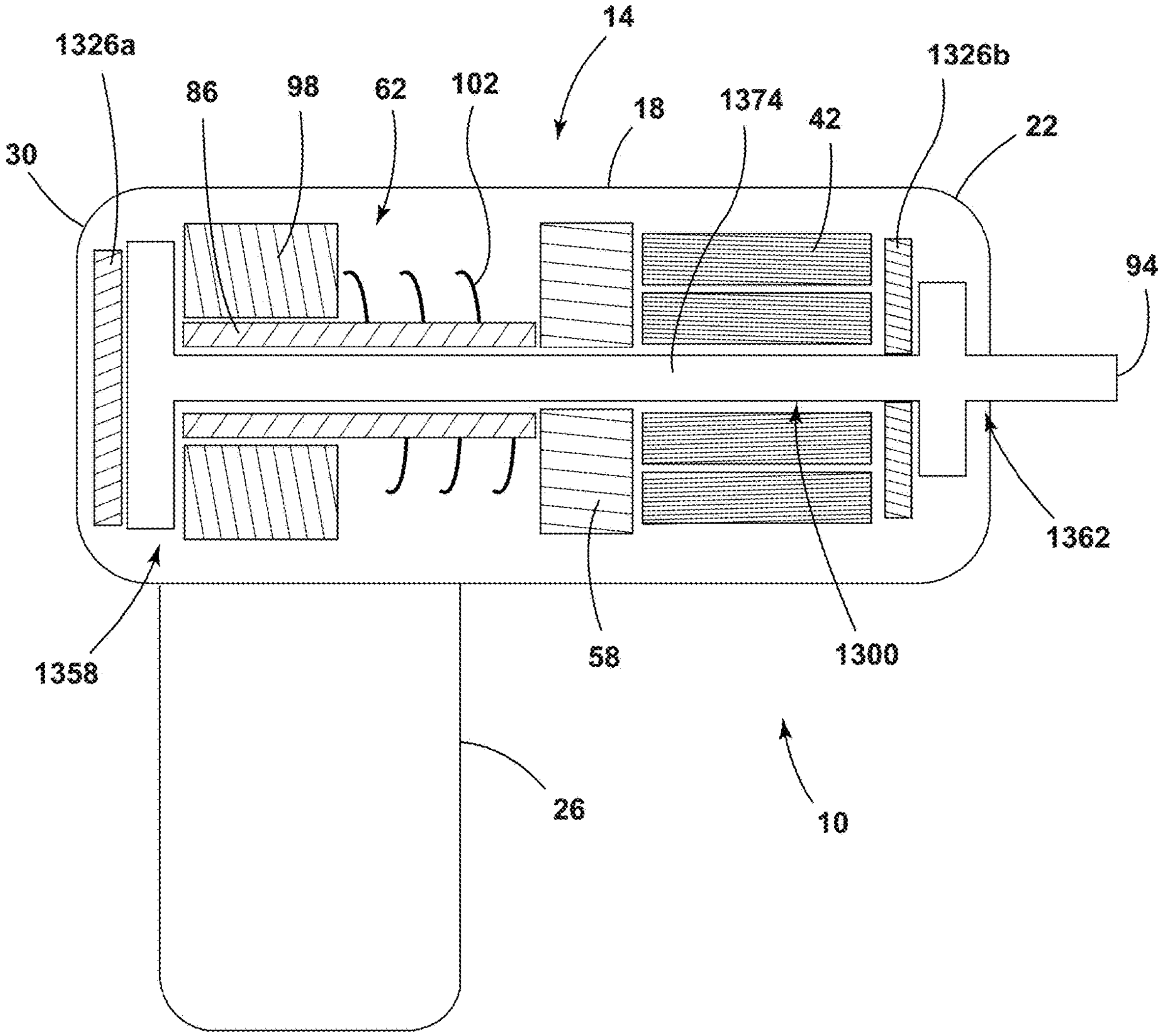
FIG. 27 is a plan view a rotary impact tool incorporating the anvil with integrated torque stick of FIG. 26.

FIGS. 26 and 27 illustrate a torque stick 1300 according to another embodiment of the invention. The torque stick 1300 shown in FIGS. 22 and 23 is like the torque stick 100 shown in FIG. 7, with like structure being identified with like reference numerals plus "1200."

With reference to FIGS. 26 and 27, the torque stick 1300 is integrated with the anvil 94, such that anvil 94 itself functions as a torsion spring to limit the amount of torque delivered from the impact wrench 10 to a workpiece within a predetermined torque range. A user may couple another torque stick (with a spring stiffness k different than the torque stick 1300) in series to fine tune the amount of deliverable torque from the impact wrench 10. The torque stick 1300 includes a first end 1358 adjacent the anvil lugs 110, a second end 1362 adjacent the square drive, and an elongated shaft 1374 that extends between the first end 1358 and the second end 1362 along a rotational axis 1354. The cross-sectional area of the elongated shaft 1374 is diametrically smaller than the cross-sectional area of the first end 1358 and the second end 1362. As shown in FIG. 27, the first end 1358 of the torque stick 1300 (i.e., the anvil 94) may be disposed adjacent the end cap 30 of the motor housing portion 18, where the elongated shaft 1374 extends the entire length of the housing 14 and the second end 1362 protrudes through the front housing portion 22. By extending the length of the torque stick 1300, the elongated shaft 1374 provides the torque stick 1300 with an increased deflection capacity (or twist) through the spring stiffness k when the reaction torque is exerted on torque stick 1300 by the workpiece. The torque stick 1300 operates in a similar manner to the torque stick 100.

With reference to FIG. 27, the drive assembly 62 still includes the camshaft 86, a hammer 98 supported on and axially slidable relative to the camshaft 86, and the anvil 94. The only difference is that anvil 94 of this embodiment is the torque stick 1300. By integrating the torque stick 1300 within the impact wrench 10, additional anvil position sensors 1326*a*, 1326*b* may be provided in the housing 14 adjacent the first end 1358 and the second end 1362 of the torque stick 1300. The first sensor 1326*a* is capable of detecting the angular displacement of first end 1358 of the torque stick 1300 and the second sensor 1326*b* is capable of detecting the angular displacement of the second end 1362. While impacting, the hammer 98 exerts a rotational force on the first end 1358 which, in turn, transfers the force through the torque stick 1300 to drive a workpiece. As the torque stick 1300 absorbs some of the rotational force, the first end 1358 rotates relative to the second end 1362. Accordingly, the angular displacement of the first end 1358 is greater than the angular displacement of the second end 1362. The first sensor 1326*a* and the second sensor 1326*b* relay a signal to the controller 122 in order to calculate the amount of torque applied to the workpiece and the drive angle. With the elongated shaft 1374, the deflection capacity of the torque stick 1100 is increased, which provides greater resolution to the first and second sensors 1326*a*, 1326*b*.

Figure 28:
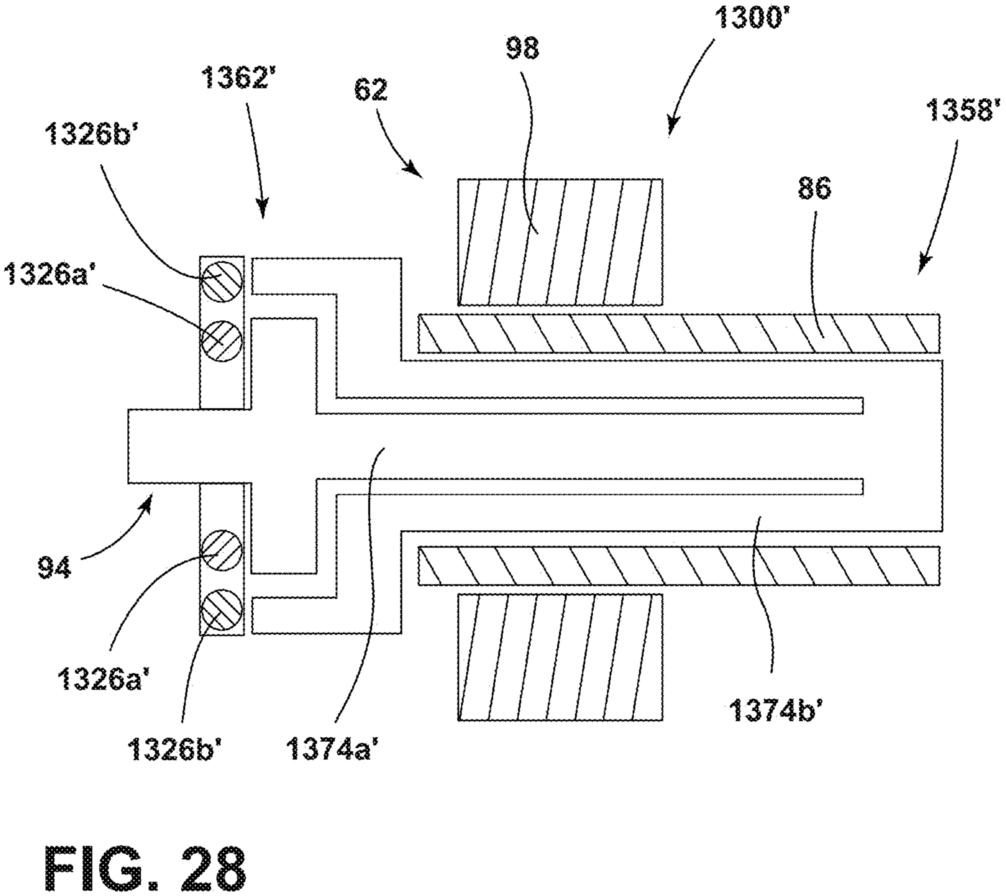
FIG. 28 is a schematic view of an anvil in accordance with another embodiment of the invention for use with a rotary impact tool, illustrating a torque stick integrated with the anvil.

Although the torque stick 1300 (i.e., the anvil 94) is illustrated to have a geometry similar to that of the torque stick 100, in other embodiments, the torque stick 1100 may alternatively have a geometry more similar to the torque sticks 300, 500, 700, 900, or 1100. For example, a serpentine-style torque stick 1300' is illustrated in FIG. 28 that is similar to the torque stick 300. In this embodiment, the drive assembly 62 still includes the camshaft 86, a hammer 98 supported on and axially slidable relative to the camshaft 86, and the anvil 94. The only difference is that anvil 94 of this embodiment is the serpentine-style torque stick 1300'. By integrating the torque stick 1300' within the impact wrench 10, additional sensors 1326*a'*, 1326*b'* may be provided in the front housing portion 22 adjacent the second end 1362' of the torque stick 1300'. Specifically, the first sensor 1326*a'* is disposed adjacent a first concentric body 1374*a'* and capable of detecting the angular displacement of the first concentric body 1374*a'*, and the second sensor 1326*b'* is disposed adjacent a second concentric body 1374*b'* and capable of detecting the angular displacement of the second concentric body 1374*b'*. While impacting, the hammer 98 exerts a force on the second concentric body 1374*b'* which, in turn, transfers the force to the first concentric body 1374*a'* to drive a workpiece. The second concentric body 1374*b'* absorbs some of the rotational force by rotating relative to the first concentric body 1374*a'*. Accordingly, the angular displacement of the second concentric body 1374*b'* is greater than the angular displacement of the first concentric body 1374*a'*. The first sensor 1326*a'* and the second sensor 1326*b'* relay a signal to the controller 122 in order to calculate the amount of torque applied to the workpiece and the drive angle.

Figure 35:
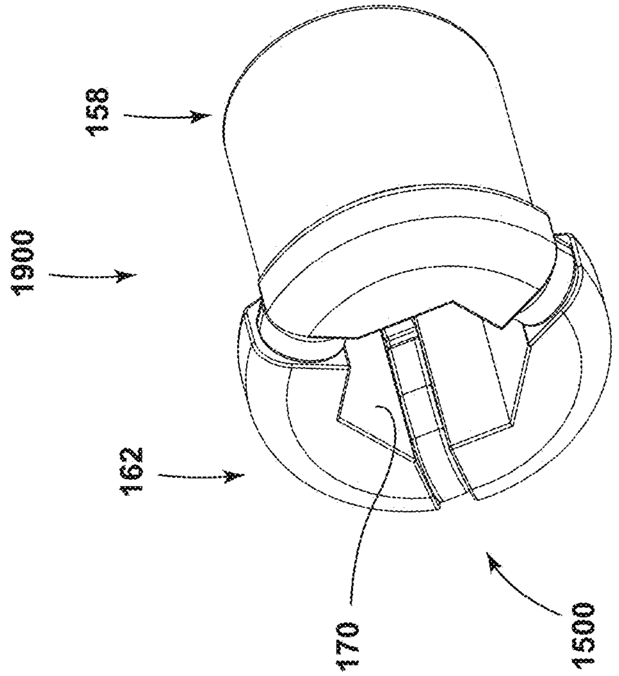
FIG. 35 is a perspective view of a tool adapter incorporating the rotational locking means of FIG. 29.

With reference to FIG. 29-34, any one of the torque sticks disclosed above (e.g., torque stick 100, 300, 500, 700, 900, 1100, 1300) may include the rotational locking means on at least one end of the torque stick to minimize relative rotation (i.e., backlash, clearance, slop, tolerance, etc.) between the torque stick and a workpiece. Furthermore, as shown in FIG. 35, the rotational locking means may also be incorporated on a tool accessory 1900 (e.g., socket, a socket adapter, a socket extension, bit holder, other similar socket component, etc.). Although the tool accessory 1900 includes the leaf spring detent mechanism 1500, in other embodiments, the tool accessory 1900 may alternatively include rotational locking means 1600, 1700, or 1800. For sake of brevity, the torque stick 100 and the reference numerals thereof will be used to describe the rotational locking means.

Figure 29:
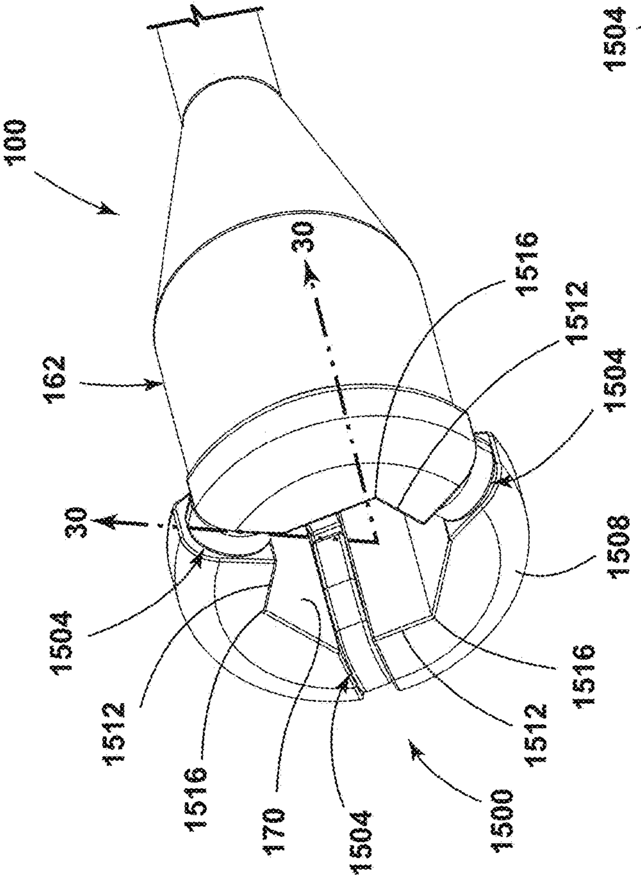
FIG. 29 is an enlarged perspective view of the torque stick of FIG. 6, illustrating a rotational locking means in accordance with an embodiment of the invention.
Figure 30:
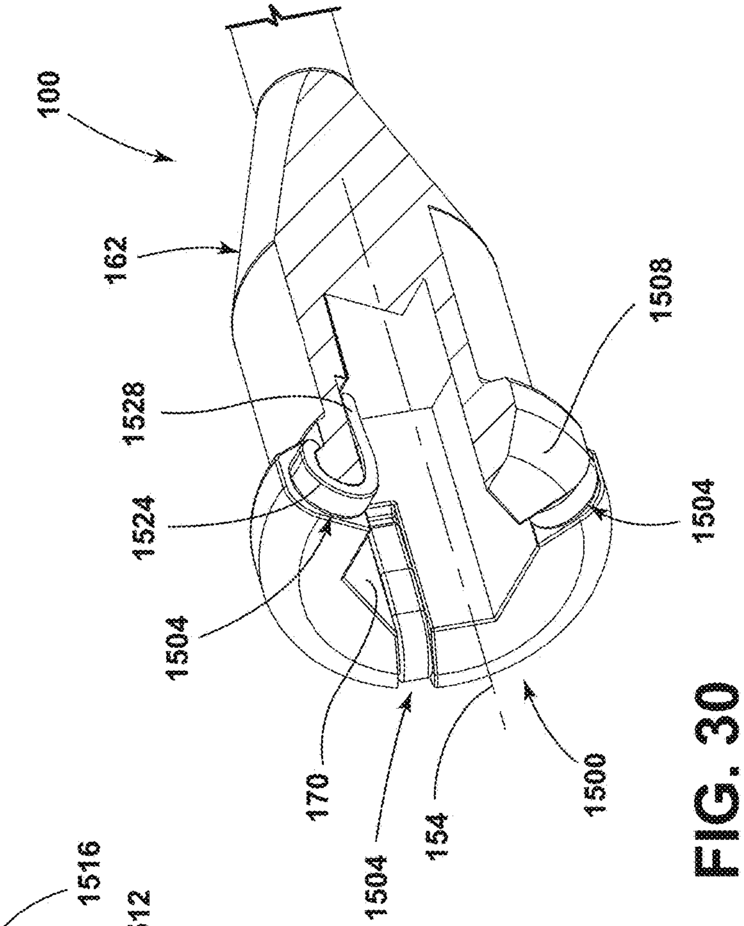
FIG. 30 is a partial cross-sectional view of the rotational locking means taken along line 30-30 of FIG. 29.

With particular reference to FIGS. 29 and 30, the torque stick 100 includes the leaf spring detent mechanism 1500 to maintain and secure a workpiece in the workpiece socket 170. Although the leaf spring detent mechanism 1500 is disposed on the second end 162, in other embodiments, the leaf spring detent mechanism 1500 may alternatively be disposed on the first end 158 or both the first and second ends 158, 162. Accordingly, the leaf spring detent mechanism 1500 may also be used to maintain and secure the anvil 94 in the anvil socket 166. The leaf spring detent mechanism 1500 includes three leaf springs 1504 that are circumferentially spaced 120 degrees apart along a rim 1508 of the workpiece socket 170. The workpiece socket 170 is configured to receive hex-shaped bolts, causing the leaf springs 1504 to deform and exert a biasing force on hex-shaped bolts about the rotational axis 154 of the torque stick 100, as explained in further detail below.

In the illustrated embodiment, there is one leaf spring 1504 disposed on a flat section 1512 adjacent every other apex 1516 of the workpiece socket 170. As shown in FIG. 30, each leaf spring 1504 includes a base 1524 that curls around and couples to a portion of the rim 1508, and an arm 1528 that extends from the base 1524 into the workpiece socket 170. The arm 1528 is at least partially curved, such that the arm 1528 extends radially inward toward the rotational axis 154 of the torque stick 100. As a result, each arm 1528 mechanically interferes with and contacts hex-shaped bolts to reduce the amount of clearance (e.g., slop, runout, tolerance, etc.) between hex-shaped bolts and the workpiece socket 170. With each arm 1528 being positioned adjacent the apex 1516, the arms 1528 deform and bias the hex-shaped bolt to twist within the workpiece socket 170 about the rotational axis 154 until the hex-shaped bolt jams against the workpiece socket 170. Such a configuration creates a snug fit between the workpiece socket 170 and hex-shaped bolts to minimize any relative rotation (i.e., backlash) therebetween.

Although the illustrated leaf spring detent mechanism 1500 includes three leaf springs 1504, in other embodiments, the leaf spring detent mechanism 1500 may include fewer or more than three leaf springs 1504.

Figure 31:
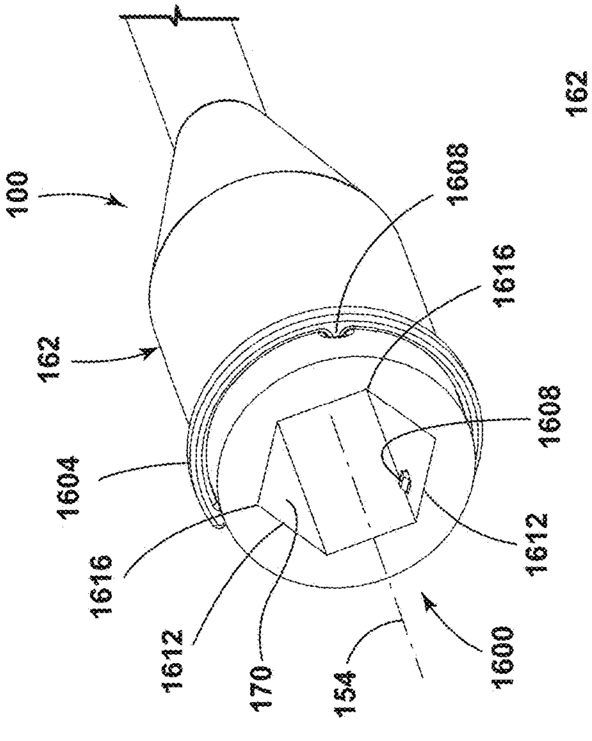
FIG. 31 is an enlarged perspective view of the torque stick of FIG. 6, illustrating a rotational locking means in accordance with another embodiment of the invention.

With particular reference to FIG. 31, the torque stick 100 includes a spring detent mechanism 1600 to maintain and secure a workpiece in the workpiece socket 170. Although the spring detent mechanism 1600 is disposed on the second end 162, in other embodiments, the spring detent mechanism 1600 may alternatively be disposed on the first end 158 or both the first and second ends 158, 162. Accordingly, the spring detent mechanism 1600 may also be used to maintain and secure the anvil 94 in the anvil socket 166. The spring detent mechanism 1600 includes an annular ring 1604 disposed around the outer periphery of the workpiece socket 170 and three pins 1608 that project radially inward from the annular ring 1604. The three pins 1608 are circumferentially spaced 120 degrees apart about the rotational axis 154 of the torque stick 100, with one pin 1608 being disposed on a flat section 1612 adjacent every other apex 1616 of the workpiece socket 170. The workpiece socket 170 is configured to receive hex-shaped bolts, causing the annular ring 1604 to deform as the pins 1608 move radially outward. Thus, the pins 1608 exert a biasing force on hex-shaped bolts about the rotational axis 154 of the torque stick 100, as explained in further detail below.

As shown in FIG. 31, each pin 1608 (although only one is shown) extends into the workpiece socket 170. Each pin 1608 mechanically interferes with and contacts hex-shaped bolts to reduce the amount of clearance (e.g., slop, runout, tolerance, etc.) between hex-shaped bolts and the workpiece socket 170. With each pin 1608 being positioned adjacent the apex 1616, the pins 1608 urge the hex-shaped bolt to twist within the workpiece socket 170 until the hex-shaped bolt jams against the workpiece socket 170. Such a configuration creates a snug fit between the workpiece socket 170 and hex-shaped bolts to minimize any relative rotation (i.e., backlash) therebetween.

Although the illustrated spring detent mechanism 1600 includes three pins 1608, in other embodiments, the spring detent mechanism 1600 may include fewer or more than three pins 1608.

Figure 33:
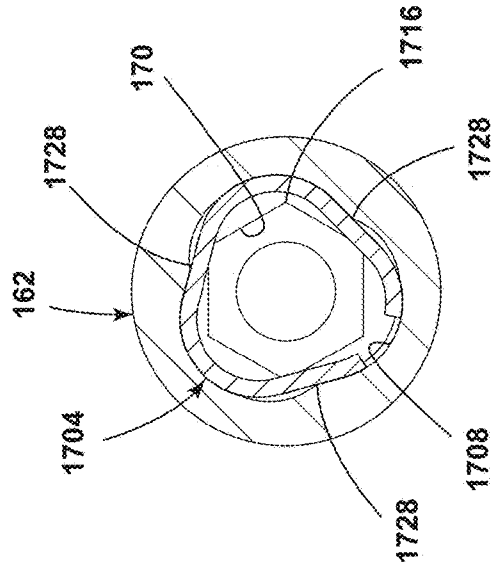
FIG. 33 is a cross-sectional view of the rotational locking means taken along line 33-33 of FIG. 32.
Figure 32:
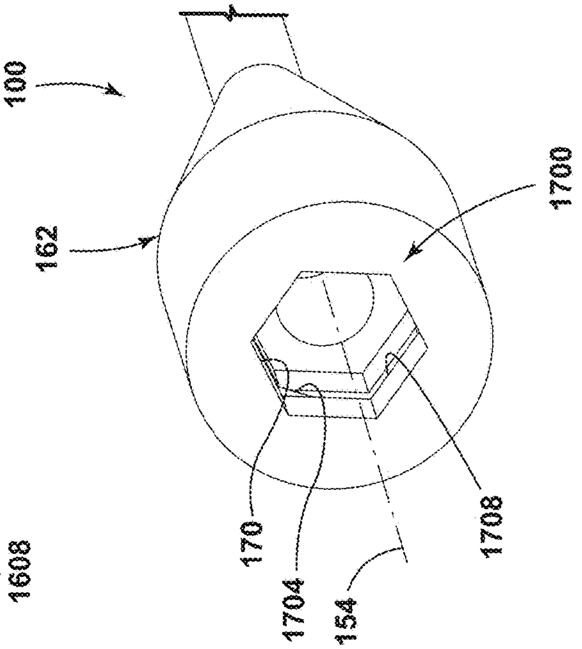
FIG. 32 is an enlarged perspective view of the torque stick of FIG. 6, illustrating a rotational locking means in accordance with yet another embodiment of the invention.

With particular reference to FIGS. 32 and 33, the torque stick 100 includes retaining ring detent mechanism 1700 to maintain and secure a workpiece in the workpiece socket 170. Although the retaining ring detent mechanism 1700 is disposed on the second end 162, in other embodiments, the retaining ring detent mechanism 1700 may alternatively be disposed on the first end 158 or both the first and second ends 158, 162. Accordingly, the retaining ring detent mechanism 1700 may also be used to maintain and secure the anvil 94 in the anvil socket 166. The retaining ring detent mechanism 1700 includes a retaining ring 1704 that is disposed within a groove 1708 on the inner periphery of the workpiece socket 170. The workpiece socket 170 is configured to receive hex-shaped bolts, causing the retaining ring 1704 to deform and exert a biasing force on hex-shaped bolts about the rotational axis 154 of the torque stick 100, as explained in further detail below.

In the illustrated embodiment, the retaining ring 1704 includes three legs 1728 that extend radially inward from the workpiece socket 170 relative to the rotational axis 154. Each leg 1728 is adjacent every other apex 1716 of the workpiece socket 170. As a result, each leg 1728 mechanically interferes with and contacts hex-shaped bolts to reduce the amount of clearance (e.g., slop, runout, tolerance, etc.) between hex-shaped bolts and the workpiece socket 170. With each leg 1728 being positioned adjacent the apex 1716, the legs 1728 deform and bias the hex-shaped bolt to twist within the workpiece socket 170 about the rotational axis 154 until the hex-shaped bolt jams against the workpiece socket 170. Such a configuration creates a snug fit between the workpiece socket 170 and hex-shaped bolts to minimize any relative rotation (i.e., backlash) therebetween.

Figure 34:
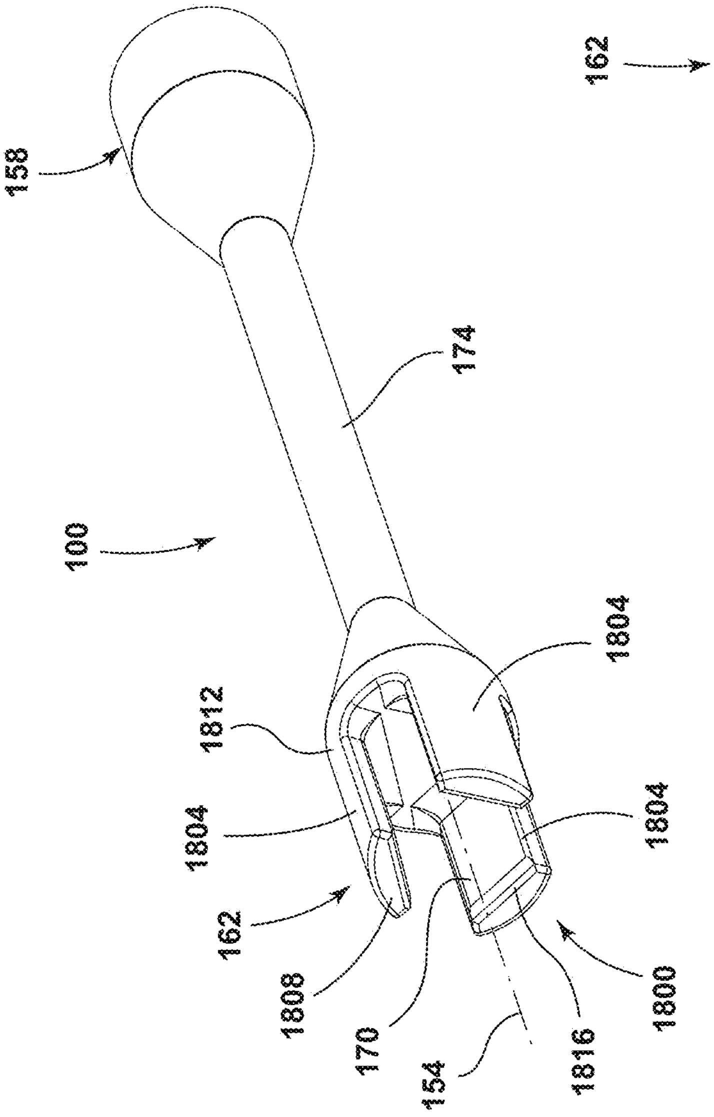
FIG. 34 is a perspective view of the torque stick of FIG. 6, illustrating a rotational locking means in accordance with still yet another embodiment of the invention.

With particular reference to FIG. 34, the torque stick 100 includes friction wedge mechanism 1800 to maintain and secure a workpiece in the workpiece socket 170. Although the friction wedge mechanism 1800 is disposed on the second end 162, in other embodiments, the friction wedge mechanism 1800 may alternatively be disposed on the first end 158 or both the first and second ends 158, 162. Accordingly, the friction wedge mechanism 1800 may also be used to maintain and secure the anvil 94 in the anvil socket 166. The friction wedge mechanism 1800 includes three fingers 1804 that are circumferentially spaced 120 degrees apart about the rotational axis 154 of the torque stick 100. Each finger 1804 is angled relative to the rotational axis 154 with a distal end 1808 of each finger 1804 being disposed more radially inward than a base 1812 of each finger 1804. The workpiece socket 170 is configured to receive hex-shaped bolts, causing each finger 1804 to deform radially outward relative to the rotational axis 154 and grip the workpiece, as explained in further detail below.

As shown in FIG. 34, each finger 1804 is cantilevered away from the second end 162 of the torque stick 100. The fingers 1804 also includes a beveled lip 1816 that allows hex-shaped bolts to slide along as the hex-shaped bolts urge the fingers 1804 radially outward. Because the fingers 1804 mechanically interfere with hex-shaped bolts, the fingers 1804 deform outward and exert a clamping force on hex-shaped bolts to reduce the amount of clearance (e.g., slop, runout, tolerance, etc.) between hex-shaped bolts and the workpiece socket 170. Such a configuration creates a snug fit between the workpiece socket 170 and hex-shaped bolts to minimize any relative rotation (i.e., backlash) therebetween.

Various features of the invention are set forth in the following claims.

What is claimed is:

1. A tool attachment for use with a rotary impact tool to drive a workpiece, the tool attachment comprising:

a first end configured to engage the rotary impact tool;

a second end disposed distally from the first end and configured to engage the workpiece;

a first concentric body that is coupled to and rotated by the first end; and a second concentric body that is coupled to the second end and rotated by the first concentric body, the second concentric body and the first concentric body are coupled together, wherein the first concentric body rotates relative to the second concentric body to limit an amount of torque delivered from the rotary impact tool to the workpiece.

2. The tool attachment of claim 1, further comprising a third concentric body that interconnects the first concentric body and the second concentric body.

3. The tool attachment of claim 1, wherein an air gap exists between the first concentric body and the second concentric body.

4. The tool attachment of claim 1, wherein the first concentric body includes at least one tab and the second concentric body includes at least one slot that receives the tab of the first concentric body, the tab is configured to transfer rotational force to the slot, and wherein the tab extends tangentially from the first concentric body.

5. The tool attachment of claim 4, wherein the at least one tab extends along the first concentric body in a direction parallel with a rotational axis of the first concentric body, and wherein the at least one slot extends along the second concentric body along a helically pitched path about the rotational axis.

6. The tool attachment of claim 1, further including, at one end, a means for rotationally locking the tool attachment to at least one of an anvil of the rotary impact tool or the workpiece to inhibit relative rotational movement between the tool attachment and at least one of the anvil or the workpiece.

7. The tool attachment of claim 6, wherein the rotational locking means is disposed on the first end of the tool attachment.

8. The tool attachment of claim 6, wherein the rotational locking means is disposed on the second end of the tool attachment.

9. The tool attachment of claim 6, wherein the rotational locking means includes a plurality of leaf springs that are circumferentially spaced approximately 120 degrees apart along a rim of the tool attachment.

10. The tool attachment of claim 9, wherein the leaf springs are configured to deform and exert a biasing force on at least one of an anvil of the rotary impact tool or the workpiece about a rotational axis of the tool attachment.

11. The tool attachment of claim 10, wherein each of the leaf springs is at least partially curved, such that each of the leaf springs extends radially inward toward the rotational axis, resulting in a mechanical interference between each of the leaf springs and at least one of the anvil or the workpiece to reduce an amount of clearance therebetween.

12. The tool attachment of claim 6, wherein the rotational locking means includes a plurality of pins that are circumferentially spaced approximately 120 degrees apart along a rim of the tool attachment.

13. The tool attachment of claim 12, wherein the pins are configured to displace radially outward and exert a biasing force on at least one of an anvil of the rotary impact tool or the workpiece about a rotational axis of the tool attachment.

14. The tool attachment of claim 13, wherein each of the pins mechanically interferes with at least one of the anvil or the workpiece to reduce an amount of clearance between the tool attachment and at least one of the anvil or the workpiece.

15. The tool attachment of claim 6, wherein the rotational locking means includes a retaining ring that is disposed in a groove of the tool attachment.

16. The tool attachment of claim 15, wherein the retaining ring is configured to displace radially outward and exert a biasing force on at least one of an anvil of the rotary impact tool or the workpiece about a rotational axis of the tool attachment.

17. The tool attachment of claim 16, wherein the retaining ring mechanically interferes with at least one of the anvil or the workpiece to reduce an amount of clearance between the tool attachment and at least one of the anvil or the workpiece.

18. The tool attachment of claim 6, wherein the rotational locking means includes a plurality of fingers that are circumferentially spaced approximately 120 degrees apart along a rim of the tool attachment.

19. The tool attachment of claim 18, wherein each of the fingers includes a base coupled to the rim and a distal end extending away and cantilevered from the base, wherein each of the fingers is angled radially inward relative to a rotational axis of the tool attachment.

20. The tool attachment of claim 19, wherein each of the fingers is configured to displace radially outward and exert a clamping force on at least one of an anvil of the rotary impact tool or the workpiece.

21. The tool attachment of claim 20, wherein each of the fingers mechanically interferes with at least one of the anvil or the workpiece to reduce an amount of clearance between the tool attachment and at least one of the anvil or the workpiece.

* * * * *